(12) United States Patent
Wang et al.

(10) Patent No.: US 10,662,268 B2
(45) Date of Patent: May 26, 2020

(54) CATALYST COMPONENT FOR OLEFIN POLYMERIZATION, CATALYST, AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jun Wang, Beijing (CN); Mingzhi Gao, Beijing (CN); Jing Ma, Beijing (CN); Haitao Liu, Beijing (CN); Jianhua Chen, Beijing (CN); Xiaoxia Cai, Beijing (CN); Jixing Ma, Beijing (CN); Jianjun Hu, Beijing (CN); Changxiu Li, Beijing (CN); Zhihui Zhang, Beijing (CN); Changyou Ma, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 16/336,103

(22) PCT Filed: Sep. 22, 2017

(86) PCT No.: PCT/CN2017/103045
§ 371 (c)(1),
(2) Date: Mar. 23, 2019

(87) PCT Pub. No.: WO2018/054363
PCT Pub. Date: Mar. 29, 2018

(65) Prior Publication Data
US 2019/0256623 A1 Aug. 22, 2019

(30) Foreign Application Priority Data

Sep. 23, 2016 (CN) .......................... 2016 1 0846984
Sep. 23, 2016 (CN) .......................... 2016 1 0846996
Sep. 23, 2016 (CN) .......................... 2016 1 0847648
Sep. 23, 2016 (CN) .......................... 2016 1 0847666

(51) Int. Cl.
*C08F 10/06* (2006.01)
*C08F 110/06* (2006.01)

(52) U.S. Cl.
CPC ............ *C08F 10/06* (2013.01); *C08F 110/06* (2013.01); *C08F 2410/01* (2013.01)

(58) Field of Classification Search
CPC ....................................................... C08F 10/06
See application file for complete search history.

(56) References Cited

U.S. PATENT DOCUMENTS

| 4,784,983 | A | 11/1988 | Mao et al. |
| 4,971,937 | A | 11/1990 | Albizzati et al. |

FOREIGN PATENT DOCUMENTS

| CN | 1321692 A | 11/2001 |
| CN | 1330086 A | 1/2002 |
| CN | 1480471 A | 3/2004 |
| CN | 101184782 A | 5/2008 |
| CN | 100491416 C | 5/2009 |
| CN | 101423574 B | 5/2011 |
| CN | 101798362 B | 7/2012 |
| CN | 102762603 A | 10/2012 |
| CN | 102030844 B | 7/2014 |
| CN | 104558282 A | 4/2015 |
| CN | 105085727 A | 11/2015 |

(Continued)

OTHER PUBLICATIONS

Bourget-Merle, Laurence et al. "The Chemistry of B-Diketiminatomental Complexes", Chemical Reviews, 2002, vol. 102, No. 9, p. 3031-3065.

(Continued)

*Primary Examiner* — Catherine S Branch
(74) *Attorney, Agent, or Firm* — Novick, Kim & Lee, PLLC; Allen Xue

(57) ABSTRACT

Disclosed is a catalyst component for olefin polymerization. The catalyst component comprises magnesium, titanium, halogen and an internal electron donor. The internal electron donor includes an imine compound with a ketone group as shown in Formula I. Disclosed further is a method of preparing the catalyst component, and a catalyst for olefin polymerization containing the catalyst component. When the catalyst is used in olefin polymerization reaction especially propene polymerization reaction, the catalyst has a high long-term activity and good hydrogen response, and the obtained polymer has characteristics of an adjustable isotactic index and a relatively wide molecular weight distribution.

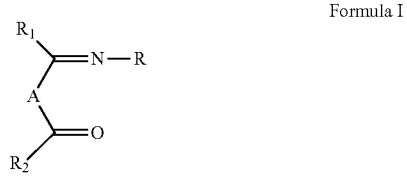

Formula I

24 Claims, No Drawings

(56) References Cited

FOREIGN PATENT DOCUMENTS

| CN | 105085731 A | 11/2015 |
|---|---|---|
| CN | 105940022 A | 9/2016 |
| EP | 0728769 B1 | 8/1998 |
| WO | 199856830 A2 | 12/1998 |
| WO | 199856834 A1 | 12/1998 |
| WO | 200055215 A1 | 9/2000 |
| WO | 200157099 A1 | 8/2001 |
| WO | 200163231 A1 | 8/2001 |

OTHER PUBLICATIONS

Johnson, Lynda K. et al. "New Pd(II)- and Ni(II)-Based Catalysts for Polymerization of Ethylene and a-Olefins", Journal of American Chemistry Society, 1995, vol. 117, p. 6414-6415.

Johnson, Lynda K. et al. "Copolymerization of Ethylene and Propylene with Fuctionalized Vinyl Monomers by Palladium (II) Catalysts", Journal of American Chemistry Society, 1996, vol. 118, p. 267-268.

Scollard, John D. et al. "Living Polymerization of a-Olefins by Chelating Diamide Complexes of Titanium", Journal of American Chemistry Society, 1996, vol. 118, p. 10008-10009.

Scollard, John D. et al. "Polymerization of a-Olefins by Chelating Diamide Complexes of Titanium", Macromolecules, 1996, vol. 29, p. 5241-5243.

Jin, Xin et al "Synethsis of B-Iminoaminate Zirconium Complexes and Their Application in Ethylene Polymerization", Macromolecules, Aug. 22, 2000, vol. 33, No. 17, p. 6205-6207.

Kim, Woo-Kyu et al. "[(Ph)2nacnac]MCl2(THF)2 (M=Ti, V, Cr): A New Class of Homogeneous Olefin Polymerization Catalysts Featuring B-Diiminate Ligands", Organometallics, 1998, vol. 17, p. 4541-4543.

CATALYST COMPONENT FOR OLEFIN POLYMERIZATION, CATALYST, AND USE THEREOF

CROSS-REFERENCE TO RELATED APPLICATIONS

The present application is a national stage application of PCT/CN2017/103045, filed on Sep. 22, 2017, which claims the priorities of the following patent applications filed on Sep. 23, 2016, the entirety of which is incorporated herein by reference.

1. Chinese patent application CN 201610846996.7 entitled "Catalyst component for olefin polymerization, catalyst, and use thereof";
2. Chinese patent application CN 201610846984.4 entitled "Catalyst component for olefin polymerization, catalyst, and use thereof";
3. Chinese patent application CN 201610847666.X entitled "Catalyst component for olefin polymerization, catalyst, and use thereof"; and
4. Chinese patent application CN 201610847648.1 entitled "Catalyst component for olefin polymerization, catalyst, and use thereof".

FIELD OF THE INVENTION

The present invention relates to a catalyst component for olefin polymerization, a catalyst and use thereof, and belongs to the technical field of petrochemical engineering.

BACKGROUND OF THE INVENTION

Generally, catalysts used for olefin polymerization can be classified into three categories: traditional Ziegler-Natta catalysts, metallocene catalysts, and non-metallocene catalysts. Regarding traditional Ziegler-Natta catalysts for propene polymerization, with the development of electron donor compounds in catalysts, polyolefin catalysts are also constantly undated. The development of catalysts has experienced the $1^{st}$ generation of $TiCl_3.AlCl_3/AlEt_2Cl$ system, the $2^{nd}$ generation of $TiCl_3/AlEt_2Cl$ system, the $3^{rd}$ generation of $TiCl_4.ED.MgCl_2/AlR_3.ED$ system using magnesium chloride as carriers, monoester or aromatic diester as internal electron donor, and silane as external electron donor, and the newly developed catalyst system using diether compounds and diester compounds as internal electron donors. The activity of catalysts for catalyzing polymerization reaction and the isotacticity of the obtained polypropene has been greatly improved. In existing technologies, titanium catalysts used for propene polymerization mainly use magnesium, titanium, halogen, and electron donor as basic components, among which electron donor compounds are indispensible elements of catalyst components. Till now, various internal electron donor compounds have been disclosed, these compounds including, for example, monocarboxylic esters or polycarboxylic esters, acid anhydrides, ketones, monoethers or polyethers, alcohols, amines, and derivatives thereof, and so on, among which commonly used ones are aromatic dicarboxylic esters such as di-n-butyl phthalate (DNBP) or diisobutyl phthalate (DIBP), and so on. Reference can be made to U.S. Pat. No. 4,784,983. U.S. Pat. No. 4,971,937 and European patent EP0728769 disclose components of catalysts used for olefin polymerization, in which 1,3-diether compounds having two ether groups are used as electron donors, such compounds including, for example, 2-isopropyl-2-isopentyl-1,3-dimethoxy propane, 2,2-diisobutyl-1,3-dimethoxy propane, 9,9-di(methoxymethyl)fluorene, etc. Later, a class of special aliphatic dicarboxylic ester compounds, such as succinate, malonic ester, glutarate, and so on, are disclosed (see WO98/56830, WO98/56834, WO01/57099, WO01/63231, and WO00/55215). The use of such electron donor compounds can not only improve the activity of a catalyst, but also enable an obtained propene polymer to have a wider molecular weight distribution.

The most common non-metallocene catalysts for olefin polymerization are C=N polydentate ligand-containing transition metal complexes. For example, Brookhart et al first found that diimine late transition metal complexes had a relatively high catalytic activity when used for catalyzing olefin polymerization (Johnson L. K., Killian C. M., Brookhart M., *J. Am. Chem. Soc.,* 1995, 117, 6414; Johnson L. K., Ecking S. M., Brookhart M., *J. Am. Chem. Soc.,* 1996, 118, 267). Since then, the study of non-metallocene organic complexes has aroused great interest among researchers. In 1996, McConville et al reported a class of Ti and Zr metal complexes (as shown in Formula 1) chelating β-diamine, which were first examples of high-catalytic-activity N—N polydentate ligand-containing early transition metal complexes for catalyzing olefin polymerization (Scollard J. D., Mcconville D. H., Payne N. C., Vittal J. J, *Macromolecules,* 1996, 29, 5241; Scollard J. D., Mcconville D. H., *J. Am. Chem. Soc.,* 1996, 118, 10008).

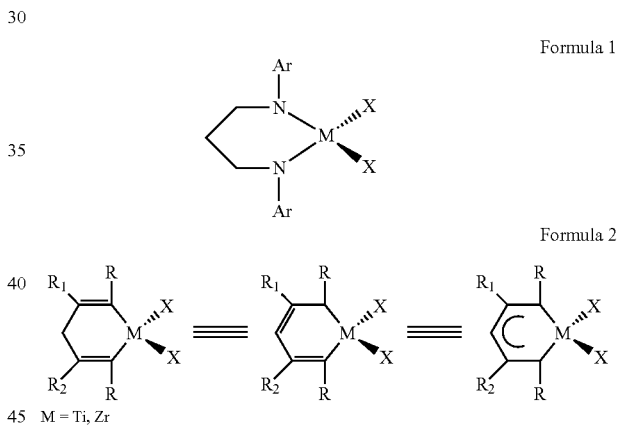

β-diamine complexes (as shown in Formula 2) are also a class of important N—N ligand-containing non-metallocene catalysts for olefin polymerization. Because of the specific structures of these complexes, the steric hindrance and electronic effect of the ligand can be easily regulated and controlled through the change of a substituent on arylamine. With the variation of metals and the surroundings of the ligand, the β-diamine ligand can bond in different ways to different metals to form different metal complexes. These ligand-containing compounds are advantageous in that they are easy to synthesize and easy to regulate and control in terms of structure, and are comparatively idea complexes for studying the relationship between the structure and the properties of a catalyst. Ligand-containing compounds with such structures have therefore attracted wide attention among researchers (Bourget-Merle L., Lappert M. F., Severn J. R., *Chem. Rev.,* 2002, 102, 3031; Kim W. K., Fevola M. J., Liable-Sands L. M., Rheingold A. L., Theopoid K. H., *Organometallics,* 1998, 17, 4541; Jin X., Novak B. M., *Macromolecules,* 2000, 33, 6205).

Polyethylene Laboratory of Sinopec Beijing Research Institute of Chemical Industry disclosed, in Chinese patent CN 00107258.7, a class of bidentate ligand-containing metal complexes for use in the copolymerization reaction of ethylene, and later disclosed, respectively in Chinese patents CN 02129548.4 (2002), CN 200410086388.8 (2004), CN 200710176588.6 (2007), a similar transition metal complex catalyst for use in the copolymerization reaction of ethylene. Shanghai Institute of Organic Chemistry, Chinese Academy of Sciences disclosed, in Chinese patents CN 201010554473.8 and CN 201010108695.7, a class of polydentate ligand-containing metal catalysts with similar structures, for use in the copolymerization reaction of ethylene to prepare ultra-low-branched high-molecular-weight polyethylene.

In the disclosure of the above patents, the catalysts used for olefin polymerization are relevant ligand-containing metal compounds. Up till now, seldom are there reports about the direct use of such ligand-containing metal compounds in the preparation of a catalyst for propene polymerization and reports about their use related to propene polymerization.

SUMMARY OF THE INVENTION

In view of the deficiencies in the above art, an objective of the present invention is to develop a catalyst component for olefin polymerization, a catalyst containing the same, and use thereof. An internal electron donor as shown in Formula I (an imine compound with a ketone group) is added during the preparation of a catalyst, so as to form a new type of a catalytic polymerization reaction system. When the catalyst is used in olefin polymerization reaction especially propene polymerization reaction, not only the catalyst has a long-term high activity and a good hydrogen response, but also the obtained polymer has characteristics of an adjustable isotactic index and a wide molecular weight distribution.

To achieve the above objective, the present invention provides a catalyst component for olefin polymerization, comprising magnesium, titanium, halogen and an internal electron donor, wherein the internal electron donor comprises an imine compound with a ketone group as shown in Formula

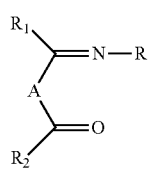

Formula I wherein in Formula I, R is selected from a group consisting of hydroxyl, $C_1$-$C_{20}$ alkyl with or without a halogen atom substitute, $C_2$-$C_{20}$ alkenyl with or without a halogen atom substitute group, and $C_6$-$C_{20}$ aryl with or without a halogen atom substitute group; $R_1$ and $R_2$ may be identical to or different from each other, each independently selected from a group consisting of hydrogen, $C_1$-$C_{20}$ alkyl, $C_2$-$C_{20}$ alkenyl, $C_1$-$C_{20}$ alkoxy, $C_6$-$C_{30}$ arylalkyl, $C_6$-$C_{30}$ alkylaryl, $C_9$-$C_{40}$ fused aryl, halogen atoms, and hydroxyl; A is $(CR_3R_4)_n$ or a heteroatom, wherein $R_3$ and $R_4$ may be identical to or different from each other, each independently selected from a group consisting of hydrogen, $C_1$-$C_{20}$ alkyl, $C_2$-$C_{20}$ alkenyl, $C_6$-$C_{30}$ arylalkyl, $C_6$-$C_{30}$ alkylaryl, and $C_9$-$C_{40}$ fused aryl, and n is 0, 1, 2, 3, 4, 5, or 6.

According to some preferred embodiments, R is methyl, ethyl, n-propyl, isopropyl, n-butyl, isobutyl, sec-butyl, tert-butyl, pentyl, hexyl, hydroxyalkyl, phenyl, halogenated phenyl, alkyl-substituted phenyl, naphthyl, biphenyl, or a heterocycle-containing group. The heterocycle-containing group is preferably a pyrrole-containing group, a pyridine-containing group, a pyrimidine-containing group, or a quinolone-containing group.

According to some preferred embodiments, R is selected from a group consisting of 2,6-dialkylphenyl (such as 2,6-dimethylphenyl, 2,6-diethylphenyl, 2,6-diisopropylphenyl), 2,4,6-trialkylphenyl (such as 2,4,6-trimethylphenyl, 2,4,6-triethylphenyl, 2,4,6-triisopropylphenyl), hydroxyalkyl-substituted phenyl (such as hydroxypropylphenyl), and naphthyl.

According to some preferred embodiments, each of $R_1$ and $R_2$ is independently selected from a group consisting of $C_1$-$C_{10}$ alkyl with or without a halogen atom (such as methyl, ethyl, n-propyl, isopropyl, n-butyl, isobutyl, sec-butyl, tert-butyl, pentyl, trifluoromethyl, and the like), phenyl, alkyl-substituted phenyl or naphthyl. Examples of alkyl-substituted phenyl includes 2,6-dialkylphenyl(such as 2,6-dimethylphenyl, 2,6-diethylphenyl, 2,6-diisopropylphenyl), 2,4,6-trialkylphenyl(such as 2,4,6-trimethylphenyl, 2,4,6-triethylphenyl, 2,4,6-triisopropylphenyl), hydroxyalkyl-substituted phenyl(such as hydroxypropylphenyl), and the like.

According to some preferred embodiments, A may be $(CR_3R_4)_n$, and n may be 1, 2, 3 or 4.

According to some preferred embodiments, A is a heteroatom, and preferably, the heteroatom may be halogen, nitrogen, oxygen, phosphorus, or silicon atom.

In the present invention, the imine compound with a ketone group as shown in Formula I may be preferably one or more selected from the following compounds: 4-butylimino-2-pentanone, 4-pentylimino-2-pentanone, 4-hexylimino-2-pentanone, 4-octylimino-2-pentanone, 4-[(1-hydroxymethyl)propylimino]-2-pentanone, 4-hydroxypropylimino-2-pentanone, 4-hydroxyethylimino-2-pentanone, 4-hydroxybutylimino-2-pentanone, 4-isopropylimino-2-pentanone, 4-(4-chlorophenylimino)-2-pentanone, 4-(2,4-dichlorophenylimino)-2-pentanone, 4-(4-trifluoromethylphenylimino)-2-pentanone, 4-phenylimino-2-pentanone, 4-(1-naphthylimino)-2-pentanone, 4-(2-naphthylimino)-2-pentanone, 4-(2,6-dimethylphenylimino)-2-pentanone, 4-(2-hydroxypropylphenylimino)-2-pentanone, 4-(2,6-diisopropylphenylimino)-2-pentanone, 4-(2,4,6-trimethylphenylimino)-2-pentanone, 4-(8-quinolylimino)-2-pentanone, 4-(4-quinolylimino)-2-pentanone, 4-(3-quinolylimino)-2-pentanone, 4-(2-chloro-6-hydroxyphenylimino)-2-pentanone, 1,1,1-trifluoro-4-(2,6-diisopropylphenylimino)-2-pentanone, 1,1,1-trifluoro-4-(2,6-dimethylphenylimino)-2-pentanone, 3-methyl-4-(2,6-dimethylphenylimino)-2-pentanone, 3-ethyl-4-(2,6-dimethylphenylimino)-2-pentanone, 3-isopropyl-4-(2,6-dimethylphenylimino)-2-pentanone, 3-butyl-4-(2,6-dimethylphenylimino)-2-pentanone, 3-methyl-4-(2,6-diisopropylphenylimino)-2-pentanone, 3-ethyl-4-(2,6-diisopropylphenylimino)-2-pentanone, 3-isopropyl-4-(2,6-diisopropylphenylimino)-2-pentanone, 3-butyl-4-(2,6-diisopropylphenylimino)-2-pentanone, 1-(2-furyl)-3-(2,6-diisopropylphenylimino)-4,4,4-trifluoro-1-butanone, 1-(2-furyl)-3-(8-quinolylimino)-4,4,4-trifluoro-1-butanone, 1-(2-furyl)-3-(2,6-dimethylphenylimino)-4,4,4-trifluoro-1-butanone, 2-hexylimino-4-heptanone, 2-isopropylimino-4- heptanone, 4-hexylimino-2-heptanone, 4-isopropylimino-2-heptanone, 4-(2-trimethylsilyl)ethylimino-2-pentanone, 5-phenylimino-3-heptanone, 5-(1-naphthylimino)-3-heptanone, 5-(2-naphthylimino)-3-heptanone, 5-(8-quinolylimino)-3-heptanone, 5-(4-quinolylimino)-3-heptanone, 5-(3-quinolylimino)-3-heptanone, 5-(2,6-diisopropylphenylimino)-3-heptanone, 5-(2,6-dimethylphenylimino)-3-heptanone, 5-butylimino-3-heptanone, 5-isopropylimino-3-heptanone, 5-hydroxyethylimino-3-heptanone, 5-hydroxybutylimino-3-heptanone, 4-ethyl-5-(8-quinolylimino)-3-heptanone, 4-methyl-5-(8-quinolylimino)-3-heptanone, 4-ethyl-5-(1-naphthylimino)-3-heptanone, 4-ethyl-5-(2-naphthylimino)-3-heptanone, 4-ethyl-5-phenylimino-3-heptanone, 4-butyl-5-phenylimino-3-heptanone, 4-methyl-5-(2,6-diisopropylphenylimino)-3-heptanone, 4-ethyl-5-(2,6-diisopropylphenylimino)-3-heptanone, 4-isopropyl-5-(2,6-diisopropylphenylimino)-3-heptanone, 4-butyl-5-(2,6-diisopropylphenylimino)-3-heptanone, 4-methyl-5-(2,6-dimethylphenylimino)-3-heptanone, 4-ethyl-5-(2,6-dimethylphenylimino)-3-heptanone, 3-isopropylimino-5-octanone, 3-(2,6-diisopropylphenylimino)-5-octanone, 5-isopropylimino-3-octanone, 6-isopropylimino-4-octanone, 5-(2,6-diisopropylphenylimino)-2-heptanone, 5-(2,4,6-trimethylphenylimino)-2-heptanone, 4-methyl-5-(2,6-dimethylphenylimino)-2-heptanone, 4-ethyl-6-(2,6-diisopropylphenylimino)-2-heptanone, 4-isopropyl-6-(2,6-diisopropylphenylimino)-2-heptanone, 6-(2,6-dimethylphenylimino)-3-octanone, 3-(2,6-diisopropylphenylimino)-1,3-diphenyl-1-acetone, 4-(2,6-diisopropylphenylimino)-4-phenyl-2-butanone, 3-(2,6-dimethylphenylimino)-1,3-diphenyl-1-acetone, 3-(2,6-diisopropylphenylimino)-1-phenyl-1-butanone, 3-(2,6-dimethylphenylimino)-1-phenyl-1-butanone, 3-(8-quinolylimino)-1,3-diphenyl-1-acetone, and 3-(3-quinolylimino)-1,3-diphenyl-1-acetone.

According to some preferred embodiments, based on the weight of the catalyst component, a content of magnesium is in a range of 5 wt-50 wt, a content of titanium is in a range of 1.0 wt-8.0 wt %, a content of halogen is in a range of 10 wt %-70 wt %, and a total content of the internal electron donor is in a range of 0.1 wt %-20 wt %.

In some preferred embodiments of the present invention, the internal electron donor may further comprise an additional electron donor compound. Preferably, the additional electron donor compound is one, two, or three selected from a group consisting of aromatic carboxylate ester compounds, diol ester compounds, and diether compounds.

In some preferred embodiments of the present invention, a molar ratio of the imine compound with a ketone group as shown in Formula I to the additional electron donor compound is in a range of 1:(0.05-20), preferably in a range of 1:(0.1-10).

According to some preferred embodiments of the present invention, the aromatic carboxylate ester compound is as shown in Formula II,

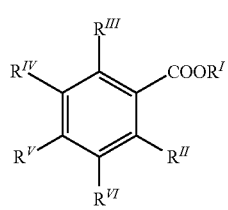

Formula II wherein in Formula II, $R^I$ is $C_1$-$C_{20}$ alkyl with or without a halogen atom substitute, $C_2$-$C_{20}$ alkenyl with or without a halogen atom substitute, $C_2$-$C_{20}$ alkynyl with or without a halogen atom substitute, or $C_6$-$C_{30}$ alkylaryl with or without a halogen atom substitute; $R^{11}$ is $C_1$-$C_{20}$ alkyl, $C_2$-$C_{20}$ alkenyl, $C_2$-$C_{20}$ alkynyl, or $C_6$-$C_{30}$ alkylaryl or ester group or amido group; be identical to or different from each other, each independently selected from a group consisting of $C_1$-$C_{20}$ alkyl, $C_2$-$C_{20}$ alkenyl, $C_2$-$C_{20}$ alkynyl, $C_2$-$C_{20}$ alkoxy, $C_6$-$C_{30}$ arylalkyl, $C_6$-$C_{30}$ alkylaryl, $C_9$-$C_{40}$ and/or fused aryl, and halogen.

According some embodiments, in Formula II, $R^I$ is methyl, ethyl, n-propyl, isopropyl, n-butyl, isobutyl, sec-butyl, tert-butyl, pentyl, isopentyl, neopentyl, hexyl, ethenyl, allyl, ethynyl, phenyl, halogenated phenyl, alkyl-substituted phenyl, naphthyl, or biphenyl.

According some embodiments, in Formula II, $R^{II}$ is methyl, ethyl, n-propyl, isopropyl, n-butyl, isobutyl, sec-butyl, tert-butyl, pentyl, isopentyl, neopentyl, hexyl, ethenyl, allyl, ethynyl, phenyl, halogenated phenyl, alkyl-substituted phenyl, naphthyl, biphenyl, ethoxycarbonyl, propoxycarbonyl, isopropoxycarbonyl, butoxycarbonyl, isobutoxycarbonyl, hexoxycarbonyl, isohexoxycarbonyl, neohexoxycarbonyl, heptyloxycarbonyl, isoheptyloxycarbonyl, neoheptyloxycarbonyl, octyloxycarbonyl, isooctyloxycarbonyl, or neooctyloxycarbonyl.

In the present invention, the aromatic carboxylate ester compounds may be one or more selected from a group consisting of ethyl benzoate, propyl benzoate, butyl benzoate, pentyl benzoate, hexyl benzoate, heptyl benzoate, octyl benzoate, nonyl benzoate, decyl benzoate, isobutyl benzoate, isopentyl benzoate, isohexyl benzoate, isoheptyl enzoate, isooctyl benzoate, isononyl benzoate, isodecyl benzoate, neopentyl benzoate, neohexyl benzoate, neoheptyl benzoate, neooctyl benzoate, neononyl benzoate, neodecyl benzoate, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisohexyl phthalate, diisoheptyl phthalate, diisooctyl phthalate, diisononyl phthalate, diisobutyl 3-methylphthalate, di-n-butyl 3-methylphthalate, diisopentyl 3-methylphthalate, di-n-pentyl 3-methylphthalate, diisooctyl 3-methylphthalate, di-n-octyl 3-methylphthalate, diisobutyl 3-ethylphthalate, di-n-butyl 3-ethylphthalate, di-n-octyl 3-ethylphthallate, diisobutyl 3-ethylphthalate, di-n-pentyl 3-ethylphthalate, diisopentyl 3-ethylphthalate, diisobutyl 3-propylphthalate, di-n-butyl 3-propylphthalate, diisobutyl 3-chlorophthalate, diisobutyl 3-butylphthalate, di-n-butyl 3-butylphthalate, di-n-butyl 4-butylphthalate, diisobutyl 4-propylphthalate, diisopentyl 4-butylphthalate, di-n-butyl 4-chlorophthalate, diisobutyl 4-chlorophthalate, di-n-octyl 4-chlorophthalate, di-n-butyl 4-methoxyphthalate, and diisobutyl 4-methoxyphthalate.

According to some embodiments of the present invention, the diol ester compound is as shown in Formula III,

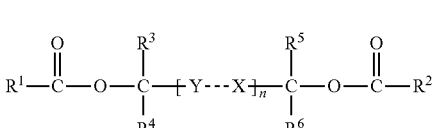

Formula III wherein in Formula III, each of X and Y is independently selected from a group consisting of carbon, oxygen, sulfur, nitrogen, boron, and silicon; $R^1$ and $R^2$ may be identical to or different from each other, each independently selected from a group consisting of halogen, alkyl, cycloalkyl, aryl, alkenyl, fused aryl, and ester group; $R^3$-$R^6$ may be identical to or different from each other, each independently selected from a group consisting of hydrogen, and substituted or unsubstituted alkyl, cycloalkyl, aryl, alkenyl, fused aryl, and ester group; $R^I$-$R^{IV}$ may be identical to or different from each other, each independently selected from a group consisting of hydrogen, and substituted or unsubstituted alkyl, cycloalkyl, aryl, alkenyl, fused aryl, and ester group; $R^3$-$R^6$ and $R^I$-$R^{IV}$ each may optionally contain one or more heteroatoms as a substitute of a carbon or hydrogen atom or both, the heteroatom being oxygen, sulfur, nitrogen, boron, silicon, phosphorus, or a halogen atom; one or more of $R^3$-$R^6$, and $R^I$ to $R^{IV}$ may be bonded together to form a ring; and n is an integer ranging from 1 to 10.

According to some preferred embodiments, the diol ester compound is as shown in Formula IIIa:

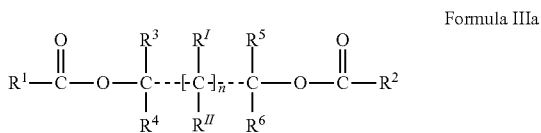

Formula IIIa wherein in Formula IIIa, $R^1$, $R^2$ and $R^3$-$R^6$ may be identical to or different from each other, each independently selected from a group consisting of $C_1$-$C_{20}$ alkyl, $C_3$-$C_{20}$ cycloalkyl, $C_2$-$C_{20}$ alkenyl, $C_6$-$C_{30}$ arylalkyl, $C_6$-$C_{30}$ alkylaryl, $C_9$-$C_{40}$ fused aryl, and ester group; $R^I$ and $R^{II}$ may be identical to or different from each other, each independently selected from a group consisting of hydrogen, $C_1$-$C_{20}$ alkyl, $C_3$-$C_{20}$ cycloalkyl, $C_2$-$C_{20}$ alkenyl, $C_6$-$C_{30}$ arylalkyl, $C_6$-$C_{30}$ alkylaryl, $C_9$-$C_{40}$ fused aryl, and ester group; $R^3$-$R^6$ and $R^I$-$R^{IV}$ each may optionally contain one or more heteroatoms as a substitute of a carbon or hydrogen atom or both, the heteroatom being oxygen, sulfur, nitrogen, boron, silicon, phosphorus, or halogen atom; one or more of $R^3$-$R^6$, $R^I$, and $R^{II}$ may be bonded together to form a ring; n is an integer ranging from 1 to 5.

According to one embodiment, the diol ester compound is a diphenol ester compound, as shown in Formula IIIb,

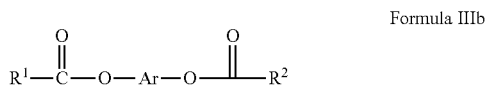

Formula IIIb wherein in Formula IIIb, $R^1$ and $R^2$ may be identical to or different from each other, each independently selected from a group consisting of $C_1$-$C_{20}$ alkyl, $C_3$-$C_{20}$ cycloalkyl, $C_2$-$C_{20}$ alkenyl, $C_6$-$C_{30}$ arylalkyl, $C_6$-$C_{30}$ alkylaryl, $C_9$-$C_{40}$ fused aryl, and ester group; and Ar represents $C_6$-$C_{30}$ aryl, $C_6$-$C_{30}$ alkylaryl or $C_9$-$C_{40}$ fused aryl.

Preferably, in Formula III, Formula IIIa and/or Formula IIIb, $R^1$ and $R^2$ are independently selected from a group consisting of methyl, ethyl, n-propyl, isopropyl, n-butyl, isobutyl, sec-butyl, tert-butyl, pentyl, hexyl, hydroxyalkyl, phenyl, halogenated phenyl, alkyl-substituted phenyl, naphthyl, biphenyl, and a heterocycle-containing group. The heterocycle-containing group is preferably a pyrrole-containing group, a pyridine-containing group, a pyrimidine-containing group, or a quinoline-containing group.

Preferably, in Formula III and Formula IIIa, each of $R^I$ and $R^{II}$ is independently selected from a group consisting of methyl, ethyl, n-propyl, isopropyl, n-butyl, isobutyl, sec-butyl, tert-butyl, pentyl, hexyl, hydroxyalkyl, phenyl, halogenated phenyl, alkyl-substituted phenyl, etc.

According to some preferred embodiments, in Formula III and/or Formula IIIa, $R^I$ and $R^{II}$ bond together to form a ring, for example, a substituted or unsubstituted fluorine ring.

Preferably, the diol ester compound or the diphenol ester compound is one or more selected from a group consisting of 2-isopropyl-1,3-dibenzoyloxypropane, 2-butyl-1,3-dibenzoyloxypropane, 2-cyclohexyl-1,3-dibenzoyloxypropane, 2-benzyl-1,3-dibenzoyloxypropane, 2-phenyl-1,3-dibenzoyloxypropane, 2-(1-naphthyl)-1,3-dibenzoyloxypropane, 2-isopropyl-1,3-diacetoxypropane, 2-isopropyl-2-isopentyl-1,3-dibenzoyloxypropane, 2-isopropyl-2-isobutyl-1,3-dibenzoyloxypropane, 2-isopropyl-2-isopentyl-1,3-dipropionyloxypropane, 2-isopropyl-2-butyl-1,3-dibenzoyloxypropane, 2-isopropyl-2-isopentyl-1-benzoyloxy-3-butyryloxypropane, 2-isopropyl-2-isopentyl-1-benzoyloxy-3-cinnamoyloxylpropane, 2-isopropyl-2-isopentyl-1-benzoyloxy-3-acetoxylpropane, 2,2-dicyclopentyl-1,3-dibenzoyloxypropane, 2,2-dicyclohexyl-1,3-dibenzoyloxypropane, 2,2-dibutyl-1,3-dibenzoyloxypropane, 2,2-diisobutyl-1,3-dibenzoyloxypropane, 2,2-diisopropyl-1,3-dibenzoyloxypropane, 2,2-diethyl-1,3-dibenzoyloxypropane, 2-ethyl-2-butyl-1,3-dibenzoyloxypropane, 2,4-dibenzoyloxypentane, 3-ethyl-2,4-dibenzoyloxypentane, 3-methyl-2,4-dibenzoyloxypentane, 3-propyl-2,4-dibenzoyloxypentane, 3-isopropyl-2,4-dibenzoyloxypentane, 2,4-di(2-propylbenzoyloxy)pentane, 2,4-di(4-propylbenzoyloxy)pentane, 2,4-di(2,4-dimethylbenzoyloxy)pentane, 2,4-di(2,4-dichlorobenzoyloxy)pentane, 2,4-di(4-chlorobenzoyloxy)pentane, 2,4-di(4-isopropylbenzoyloxy)pentane, 2,4-di(4-butylbenzoyloxy)pentane, 2,4-di(4-isobutylbenzoyloxy)pentane, 3,5-dibenzoyloxyheptane, 4-ethyl-3,5-dibenzoyloxyheptane, 4-propyl-3,5-dibenzoyloxyheptane, 4-isopropyl-3,5-dibenzoyloxyheptane, 3,5-di(4-propylbenzoyloxy)heptane, 3,5-di(4-isopropylbenzoyloxy)heptane, 3,5-di(4-isobutylbenzoyloxy)heptane, 3,5-di(4-butylbenzoyloxy)heptane, 2-benzoyloxy-4-(4-isobutylbenzoyloxy)pentane, 2-benzoyloxy-4-(4-butylbenzoyloxy)pentane, 2-benzoyloxy-4-(4-propylbenzoyloxy)pentane, 3-benzoyloxy-5-(4-isobutylbenzoyloxy)heptane, 3-benzoyloxy-5-(4-butylbenzoyloxy)heptane, 3-benzoyloxy-5-(4-propylbenzoyloxy)heptane, 9,9-dibenzoyloxymethylfluorene, 9,9-dipropionyloxymethylfluorene, 9,9-diisobutyryloxymethylfluorene, 9,9-dibutyryloxymethylfluorene, 9,9-dibenzoyloxymethyl-4-tert-butylfluorene, 9,9-dibenzoyloxymethyl-4-propylfluorene, 9,9-dibenzoyloxymethyl-1,2,3,4-tetrahydrofluorene, 9,9-dibenzoyloxymethyl-1,2,3,4,5,6,7,8-octahydrofluorene, 9,9-dibenzoyloxymethyl-2,3,6,7-diphenylpropylindene, 9,9-dibenzoyloxymethyl-1,8-dichlorofluorene, 7,7-dibenzoyloxymethyl-2,5-norbornadiene, 1,4-dibenzoyloxybutane, 2,3-diisopropyl-1,4-dibenzoyloxybutane, 2,3-dibutyl-1,4-dibenzoyloxybutane, 1,2-dibenzoyloxybenzene, 3-ethyl-1,2-dibenzoyloxybenzene, 4-butyl-1,2-dibenzoyloxybenzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, and 4-propyl-1,8-dibenzoyloxynaphthalene.

According to some preferred embodiments of the present invention, the diether compound is as shown in Formula IV,

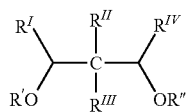

Formula IV wherein in Formula IV, R' and R" may be identical to or different from each other, each independently selected from a group consisting of $C_1$-$C_{20}$ hydrocarbyl; n is an integer ranging from 0 to 6; $R^I$-$R^{IV}$ be identical to or different from each other, each independently selected from a group consisting of hydrogen, alkoxy, substituted amino, halogen atoms, $C_1$-$C_{20}$ hydrocarbyl, and $C_6$-$C_{20}$ aryl, and two or more of $R^I$-$R^{IV}$ may be bonded together to form a ring.

According to some preferred embodiments, in Formula IV, R' and R" are $C_1$-$C_{20}$ alkyl, and are preferably methyl, ethyl, or isopropyl.

According to some preferred embodiments, in Formula IV, each of $R^I$-$R^{IV}$ is $C_1$-$C_{20}$ alkyl, and is preferably methyl, ethyl, isopropyl, n-butyl, isobutyl, n-propyl, n-pentyl, iso-pentyl, n-hexyl, or isohexyl.

In the present invention, the diether compound is preferably one or more selected from a group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-norbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

The catalyst component provided according to the present invention can be prepared by the following optional methods.

Method 1 may be described as follows. A magnesium halide is dissolved in a uniform solvent system comprising an organic epoxy compound, an organic phosphorus compound, and optionally an inert diluent. After a uniform solution is formed, the solution is mixed with a titanium tetrahalide or a derivative thereof, and solids are precipitated at the presence of a coprecipitation agent. An internal electron donor is loaded on the solids. A titanium tetrahalide or an inert diluent is used to further treat the solids to obtain a solid catalyst component comprising ingredients of titanium, magnesium, halogen, electron donor, etc.

In the present invention, the organic epoxy compound is preferably at least one selected from a group consisting of oxides of $C_2$-$C_{15}$ aliphatic alkanes, olefins, dialkenes, halogenated aliphatic olefins, or dialkenes, glycidyl ethers, and inner ethers. Certain specific compounds are as follows: epoxybutane, epoxypropane, ethylene oxide, butadiene oxide, butadiene dioxide, epoxy chloropropane, epoxy chlorobutane, epoxy chloropentane, methyl glycidyl ether, diglycidyl ether, tetrahydrofuran, tetrahydropyran, and the like. The organic epoxy compound is more preferably at least one selected from a group consisting of ethylene oxide, epoxypropane, epoxy chloropropane, tetrahydrofuran, and tetrahydropyran.

Preferably, the organic phosphorus compound can be a hydrocarbyl ester or halogenated hydrocarbyl ester of orthophosphoric acid or phosphorous acid, specifically, such as, trimethyl orthophosphate, triethyl orthophosphate, tributyl orthophosphate, tripentyl orthophosphate, trihexyl orthophosphate, triheptyl orthophosphate, trioctyl orthophosphate, triphenyl orthophosphate, trimethyl phosphite, triethyl phosphite, tributyl phosphite, phenylmethyl phosphate. The more preferred are tributyl orthophosphate, and/or triethyl orthophosphate.

The inert diluent can be at least one selected from a group consisting of $C_5$-$C_{20}$ alkane, cycloalkane and aromatic hydrocarbon, such as hexane, heptane, octane, decane, cyclohexane, beneze, toluene, xylene, or derivatives thereof, more preferably from hexane and toulene.

Method 2 may be described as follows. A magnesium halide or an organic magnesium compound, an alcohol compound, and a titanate compound or a titanium halide compound, are fully mixed in an inert solvent by stirring. The resultant mixture is heated and then cooled to obtain a spherical support, or is added an inert solvent to obtain a uniform alcohol adduct solution. The above support or the uniform alcohol adduct solution is mixed with titanium tetrahalide or a derivative thereof, kept at a low temperature for a period of time, and then heated and added an internal electron donor. After that, the resultant mixture is treated with titanium tetrahalide or an inert diulent, and finally subjected to filtration, washing, and drying to obtain a solid catalyst component comprising ingredients of titanium, magnesium, halogen, electron donor, etc.

The magnesium halide is preferably at least one selected from a group consisting of magnesium dichloride, magnesium dibromide, magnesium diiodide, methoxy magnesium chloride, ethoxy magnesium chloride, propoxy magnesium chloride, butoxy magnesium chloride, and the like, more preferably selected from magnesium dichloride and/or ethoxy magnesium chloride.

The organic magnesium compound is preferably at least one selected from a group consisting of dimethylmagnesium, diethylmagnesium, dipropylmagnesium, dibutylmagnesium, methylethylmagnesium, methylpropylmagnesium, methylbutylmagnesium, ethylpropylmagnesium, ethylbutylmagnesium, dimethoxymagnesium, diethoxy magnesium, dipropoxy magnesium, ethoxy ethylmagnesium, dibutoxy magnesium, diisobutoxy magnesium, and the like, more preferably selected from dibutylmagnesium, diethylmagnesium and diethoxy magnesium.

Method 3 may be described as follows. A magnesium halide is dissolved in a uniform solution comprising an organic epoxy compound, and an organic phosphorus compound. An inert diluent can also be added to the uniform solution. To the uniform solution is added an internal electron donor. The resultant solution is mixed with titanium tetrahalide or a derivative thereof, kept at a low temperature for a period of time, and then heated. After that, the resultant is treated with titanium tetrahalide or an inert diulent, and finally subjected to filtration, washing, and drying to obtain a solid catalyst component comprising ingredients of titanium, magnesium, halogen, electron donor, etc.

Method 4 may be described as follows. A magnesium halide is dissolved in a uniform solution comprising an organic epoxy compound, and an organic phosphorus compound. An inert diluent can also be added to the uniform solution. To the uniform solution is added an internal electron donor. The resultant solution is mixed with titanium tetrahalide or a derivative thereof, kept at a low temperature for a period of time, and then heated. After that, the resultant is treated with titanium tetrahalide or an inert diulent, then treated with an internal electron donor, and finally subjected to filtration, washing, and drying to obtain a solid catalyst component comprising ingredients of titanium, magnesium, halogen, electron donor, etc.

The present invention further provides a catalyst for olefin polymerization, in particular propene polymerization, comprising the following components: A) the catalyst component; B) an organoaluminium compound; and optionally C) an organosilicon compound.

In the catalyst for olefin polymerization, components A) and B) are essential components, and component C) is a non-essential component.

In the present invention, the organoaluminium compound may be at least one selected from a group consisting of trialkylaluminum, dialkyl aluminum chloride, alkyl aluminum chloride, and alkoxyaluminum, preferably at least one selected from tri-$C_1$-$C_6$ alkyl aluminum chloride and di-$C_1$-$C_6$-alkyl aluminum chloride, such as trimethyl aluminum, triethyl aluminum, tri-n-propylaluminum, triisopropylaluminum, tri-n-butylaluminum, triisobutylaluminum, trioctylaluminum, diethylaluminium hydride, diisobutylaluminum hydride, diethylaluminum chloride, diisobutylaluminum chloride, ethyl aluminium sesquichloride, and dichloroethylaluminum. Triethylaluminum and/or triisobutylaluminum are more preferred.

In the present invention, the organosilicon compound is preferably as shown in the formula $R^5_m Si(OR^6)_{4-m}$, wherein $0 \leq m \leq 3$, $R^5$ and $R^6$ may be identical to or different from each other, each independently selected from a group consisting of alkyl, cycloalkyl, aryl, halogenated alkyl, and amino, $R^5$ also may be a halogen or hydrogen atom. Preferably, the organosilicon compound is at least one selected from the following organosilicon compounds: trimethylmethoxysilicane, trimethylethoxysilicane, trimethylphenoxysilicane, tri-n-propylmethoxysilicane, dimethyldimethoxysilicane, dipropyldimethoxysilicane, dibutyldimethoxysilicane, dipentyldimethoxysilicane, diisopropyldimethoxysilicane, diisobutyldimethoxysilicane, dimethyldiethoxysilicane, cyclohexylmethyltriethoxysilicane, cyclohexylmethyldimethoxysilicane, cyclohexyldimethylmethoxysilicane, hexyldiethylmethoxysilicane, dicyclopentyldimethoxysilicane, cyclopentyldiethylmethoxysilicane, cyclopentylisopropyldimethoxysilicane, cyclopentylisobutyldimethoxysilicane, 4-methylcyclohexylmethyldimethoxysilicane, 4-methylcyclohexylethyldimethoxysilicane, 4-methylcyclohexylpropyldimethoxysilicane, di(4-methylcyclohexyl)dimethoxysilicane, 4-methylcyclohexylpentyldimethoxysilicane, 4-methylcyclohexylcyclopentyldimethoxysilicane, diphenyldimethoxysilicane, diphenyldiethoxysilicane, phenyltriethoxysilicane, phenyltrimethoxysilicane, ethenyltrimethoxysilicane, tetramethoxysilicane, tetraethoxysilicane, tetrapropoxysilicane, tetrabutoxysilicane and so on, preferably is selected from cyclohexylmethyldimethoxysilicane, dicyclopentyldimethoxysilicane and/or diisopropyldimethoxysilicane. These organosilicon compounds may be used alone, or can be used as a combination of two or more.

In the present invention, a molar ratio of components A) to B) to C) is preferably in a range of 1:(5-2000):(0-500), and more preferably in a range of 1:(10-800):(0-300).

In the present invention, further provided is use of the catalyst component in the field of olefin polymerization, especially in the field of propene polymerization. The present invention also provides use of the catalyst in olefin polymerization especially propene polymerization.

The present invention has the following beneficial effects. When the catalyst according to the present invention is used in olefin polymerization, the catalyst has a high long-term activity, and the obtained polymer has an adjustable isotactic index and a relatively wide molecular weight distribution.

DETAILED DESCRIPTION OF THE EMBODIMENTS

The implementing solutions of the present invention will be explained in detail below in conjunction with the embodiments. Those skilled persons in the art shall appreciate that the following embodiments are merely for illustrating the present invention, and shall not be construed as limiting the scope of the present invention. Where specific conditions in an embodiment are not specified, normal conditions or conditions suggested by manufacturers are adopted. Where manufacturers of reagents or instruments are not specified, the reagents or instruments shall be normal products available by purchase from the market.

Testing Methods:

1. Melt Index (MI) of the Polymer: Melt index of the polymer was measured based on GB/T3682-2000;

2. Isotactic Index (II) of Propene Polymer: Isotactic index of propene polymer was measured by heptane extraction. 2 g of dry polymer sample was put into an extractor for extraction with boiling heptane for 6 hours. The residual was dried to a constant weight to obtain a residual polymer. The isotacticity of the polymer was a ratio of the weight (g) of the residual polymer to 2 (g).

3. Molecular Weight Distribution (MWD; MWD=Mw/Mn) of the Polymer: Molecular weight distribution of the polymer was measured at 150° C. using PL-GPC220 and using trichlorobenzene as a solvent (standard sample: polystyrene; flow rate: 1.0 mL/min; column: 3×Plgel 10 um MlxED-B 300×7.5 nm).

4. Activity Calculation: activity of catalyst=(mass of prepared polyolefin)/(mass of solid components of catalyst) g/g.

Example 1A

Synthesis of 4-(2,6-diisopropylphenylimino)-2-pentanone: 2.00 g of acetylacetone, 80 mL of isopropanol, and 0.3 mL of glacial acetic acid were placed into a three-neck flask replaced by nitrogen gas, and were mixed uniformly by stirring at room temperature, followed by, at room temperature, a slow dropwise addition of 50 mL of isopropanol solution containing 3.54 g of 2,6-diisopropyl aniline. The resulting mixture was stirred to react for 4 hours, and then heated to perform a reflux reaction for 16 hours. The reaction solution was concentrated under reduced pressure, and purified by chromatographic separation, to obtain 4-(2,6-diisopropylphenylimino)-2-pentanone of 3.52 g (the yield was 68%). $^1$H-NMR (δ, ppm, TMS, CDCl$_3$): 7.63-7.60 (1H, m, ArH), 7.02-6.98 (2H, m, ArH), 3.35-3.31 (2H, m, CH), 3.24-3.20 (2H, s, CH$_2$), 2.10-2.07 (3H, s, CH$_3$), 1.38-1.32 (6H, m, CH$_3$), 1.25-1.21 (6H, m, CH$_3$), 1.03-0.98 (3H, m, CH$_3$); mass spectrum, FD-MS: 259.

Example 2A

Synthesis of 4-phenylimino-2-pentanone: 2.00 g of acetylacetone, 60 mL of absolute ethyl alcohol, and 15 mL of methylbenzene were placed into a 250 mL three-neck flask replaced by nitrogen gas, and were mixed uniformly by stirring at room temperature, followed by, at room temperature, a slow dropwise addition of 40 mL of ethanol solution containing 1.92 g of aniline. The resulting mixture was stirred to react for 2 hours, and then heated to perform a reflux reaction for 12 hours. The reaction solution was concentrated under reduced pressure, and purified by chromatographic separation, to obtain 4-phenylimino-2-pentanone of 2.03 g (the yield was 58%). $^1$H-NMR (δ, ppm, TMS, CDCl$_3$): 7.96-7.90 (3H, m, ArH), 7.53-7.47 (2H, m, ArH), 3.22-3.18 (2H, s, CH$_2$), 2.10-2.06 (3H, s, CH$_3$), 1.02-0.97 (3H, s, CH$_3$); mass spectrum, FD-MS:175.

Example 3A

Synthesis of 4-(2,6-dimethylphenylimino)-2-pentanone: 2.00 g of acetylacetone, 80 mL of isopropanol, and 0.2 mL of glacial acetic acid were placed into a three-neck flask replaced by nitrogen gas, and were mixed uniformly by stirring at room temperature, followed by, at room temperature, a slow dropwise addition of 30 mL of isopropanol solution containing 2.42 g of 2,6-dimethylaniline. The resulting mixture was stirred to react for 2 hours, and then heated to perform a reflux reaction for 18 hours. The reaction solution was concentrated under reduced pressure, and purified by chromatographic separation, to obtain a yellowish liquid of 4-(2,6-dimethylphenylimino)-2-pentanone of 1.42 g (the yield was 70%). $^1$H-NMR (δ, ppm, TMS, CDCl$_3$): 7.62-7.59 (1H, m, ArH), 7.02-6.98 (2H, m, ArH), 3.31-3.28 (2H, m, CH$_2$), 2.54-2.51 (6H, m, CH$_3$), 2.10-2.07 (3H, s, CH$_3$), 1.04-0.99 (3H, s, CH$_3$); mass spectrum, FD-MS: 203.

Example 4A

Synthesis of 4-(2-hydroxypropylphenylimino)-2-pentanone: 2.00 g of acetylacetone, 80 mL of absolute ethyl alcohol, and 30 mL of methylbenzene were placed into a 250 mL three-neck flask replaced by nitrogen gas, and were mixed uniformly by stirring, followed by, at room temperature, a slow dropwise addition of 40 mL of absolute ethyl alcohol solution containing 3.04 g of 2-hydroxypropylaniline. The resulting mixture was stirred to react for 4 hours at room temperature, and then heated to perform a reflux reaction for 24 hours. The reaction solution was concentrated under reduced pressure, and purified by chromatographic separation, to obtain 4-(2-hydroxypropylphenylimino)-2-pentanone of 3.05 g (the yield was 58%). $^1$H-NMR (δ, ppm, TMS, CDCl$_3$): 7.66-7.64 (1H, m, ArH), 7.38-7.36 (2H, m, ArH), 7.08-7.06 (1H, m, ArH), 3.67-3.63 (1H, s, OH), 3.45-3.43 (2H, s, CH$_2$), 3.15-3.13 (2H, s, CH$_2$), 2.65-2.63 (2H, s, CH$_2$), 2.14-2.12 (3H, s, CH$_3$), 1.96-1.94 (3H, s, CH$_3$), 1.45-1.42 (2H, m, CH$_3$); mass spectrum, FD-MS: 233.

Example 5A

Synthesis of 4-(2,4,6-trimethylphenylimino)-2-pentanone compound: 2.00 g of acetylacetone, 80 mL of absolute ethyl alcohol, and 0.5 mL of glacial acetic acid were placed into a three-neck flask replaced by nitrogen gas, and were mixed uniformly by stirring at room temperature, followed by, at room temperature, a slow dropwise addition of 50 mL of ethanol solution containing 2.70 g of 2,4,6-tirmethylaniline. The resulting mixture was stirred to react for 2 hours, and then heated to perform a reflux reaction for 36 hours. The reaction solution was concentrated under reduced pressure, and purified by chromatographic separation, to obtain 4-(2,4,6-trimethylphenylimino)-2-pentanone of 2.70 g (the yield was 62%). $^1$H-NMR (δ, ppm, TMS, CDCl$_3$): 7.86-7.84 (2H, m, ArH), 3.28-3.24 (2H, m, CH$_2$), 2.54-2.51(9H, m, CH$_3$), 2.12-2.08 (3H, s, CH$_3$), 1.18-1.14 (3H, s, CH$_3$); mass spectrum, FD-MS: 217.

Example 6A

Synthesis of 4-(2,6-diisopropylphenylimino)-4-phenyl-2-butanone: 1.62 g of benzoylacetone, 60 mL of isopropanol, and 0.5 mL of methanoic acid were placed into a 250 mL three-neck flask replaced by nitrogen gas, and were mixed uniformly by stirring at room temperature, followed by, at room temperature, a slow dropwise addition of 40 mL of isopropanol solution containing 1.77 g of 2,6-diisopropylaniline. The resulting mixture was stirred to react for 4 hours, and then heated to perform a reflux reaction for 36 hours. The reaction solution was concentrated under reduced pressure, to obtain a yellowish solid, which was then recrystallized with ethyl alcohol to obtain a white crystal of 2.02 g (the yield was 63%). $^1$H-NMR (δ, ppm, TMS, CDCl$_3$): 7.72-7.68 (3H, m, ArH), 7.46-7.40 (3H, m, ArH), 7.02-6.98 (2H, m, ArH), 3.35-3.31 (2H, m, CH), 3.24-3.20 (2H, s, CH$_2$), 2.10-2.07 (3H, s, CH$_3$), 1.38-1.32 (6H, m, CH$_3$), 1.25-1.21 (6H, m, CH$_3$); mass spectrum, FD-MS: 321.

Example 7A

Synthesis of 3-(2,6-diisopropylphenylimino)-1,3-diphenyl-1-acetone: 2.24 g of dibenzoylmethane, 80 mL of isopropanol, and 0.5 mL of acetic acid were placed into a 250 mL three-neck flask replaced by nitrogen gas, and were mixed uniformly by stirring at room temperature, followed by, at room temperature, a slow dropwise addition of 20 mL of isopropanol solution containing 1.80 g of 2,6-diisopropylaniline. The resulting mixture was stirred to react for 2 hours, heated to perform a reflux reaction for 8 hours, and then cooled to room temperature. The reaction solution was concentrated under reduced pressure, to obtain a yellow solid, which was then recrystallized with ethyl alcohol to obtain a yellowish crystal of 2.65 g (the yield was 69%). $^1$H-NMR (δ, ppm, TMS, CDCl$_3$): 7.86-7.84 (2H, m, ArH), 7.68-7.63 (3H, m, ArH), 7.46-7.40 (3H, m, ArH), 7.32-7.28 (3H, m, ArH), 7.02-6.98 (2H, m, ArH), 3.35-3.31 (2H, m, CH), 3.24-3.20 (2H, s, CH$_2$), 1.28-1.25 (6H, m, CH$_3$), 1.18-1.14 (6H, m, CH$_3$); mass spectrum, FD-MS: 383.

Example 8A

Synthesis of 3-(2,6-diisopropylphenylimino)-1-phenyl-1-butanone: 1.62 g of benzoylacetone, 60 mL of isopropanol, and 0.4 g of methanoic acid were placed into a 250 mL three-neck flask replaced by nitrogen gas, and were mixed uniformly by stirring at room temperature, followed by, at room temperature, a slow dropwise addition of 40 mL of isopropanol solution containing 1.77 g of 2,6-diisopropylaniline. The resulting mixture was stirred to react for 12 hours, and then heated to perform a reflux reaction for 12 hours. The reaction solution was concentrated under reduced pressure, to obtain a yellowish solid, which was then recrystallized with ethyl alcohol to obtain a white crystal of 1.28 g (the yield was 40%). $^1$H-NMR ($\delta$, ppm, TMS, CDCl$_3$): 7.86-7.82 (3H, m, ArH), 7.46-7.42 (2H, m, ArH), 7.26-7.14 (2H, m, ArH), 3.35-3.31 (2H, m, CH), 3.24-3.21 (2H, m, CH$_2$), 1.36-1.32 (6H, m, CH$_3$), 1.24-1.21 (6H, m, CH$_3$); mass spectrum, FD-MS: 321.

Example 9A

Synthesis of 5-(2,6-diisopropylphenylimino)-3-heptanone: 1.28 g of 3,5-heptadione, 80 mL of isopropanol, and 0.2 mL of acetic acid were placed into a 250 mL three-neck flask replaced by nitrogen gas, and were mixed uniformly by stirring at room temperature, followed by, at room temperature, a slow dropwise addition of 20 mL of isopropanol solution containing 1.78 g of 2,6-diisopropylaniline. The resulting mixture was stirred to react for 2 hours, heated to perform a reflux reaction for 24 hours, and then cooled to room temperature. The reaction solution was concentrated under reduced pressure, to obtain a yellow liquid, which was then purified by chromatographic separation to obtain a yellowish liquid of 1.55 g (the yield was 54%). $^1$H-NMR ($\delta$, ppm, TMS, CDCl$_3$): 7.66-7.64 (1H, m, ArH), 7.11-7.08 (2H, m, ArH), 3.31-3.28 (2H, m, CH), 3.22-3.18 (2H, s, CH$_2$), 2.50-2.47 (2H, m, CH$_2$), 1.68-1.66 (2H, m, CH$_2$), 1.28-1.25 (6H, m, CH$_3$), 1.18-1.14 (6H, m, CH$_3$), 1.12-1.07 (3H, t, CH$_3$), 0.98-0.94 (3H, t, CH$_3$); mass spectrum, FD-MS: 287.

Example 10A

Synthesis of 4-(1-naphthylimino)-2-pentanone: 2.00 g of acetylacetone, 100 mL of methylbenzene, and 0.5 g of p-methylbenzenesulfonic acid were placed into a three-neck flask replaced by nitrogen gas, and were mixed uniformly by stirring at room temperature, followed by, at room temperature, a slow dropwise addition of a methylbenzene solution containing 2.84 g of 1-naphthylamine. The resulting mixture was subjected to a reflux reaction for 24 hours with water being separated. The reactant solution was concentrated under reduced pressure to remove the solvent, followed by an addition of 100 mL of a saturated solution of sodium bicarbonate. The resulted solution was stirred for 2 hours, and then extracted three times with 50 mL of anhydrous ether. The organic phases were mixed together, and dried with anhydrous sodium sulfate. The solvent was removed. The primary product was recrystallized with ethyl alcohol, to obtain 4-(1-naphthylimino)-2-pentanone of 2.70 g (the yield was 60%). $^1$H-NMR ($\delta$, ppm, TMS, CDCl$_3$): 8.14-8.10 (3H, m, ArH), 7.86-7.82 (2H, m, ArH), 7.34-7.30 (2H, m, ArH), 3.22-3.18(2H, s, CH$_2$), 2.10-2.07 (3H, s, CH$_3$), 1.08-1.05 (3H, s, CH$_3$); mass spectrum, FD-MS: 225.

Example 11A

Synthesis of 4-(2,6-diisopropylphenylimino)-1,1,1-trifluoro-2-pentanone: 1.54 g of 1,1,1-trifluoro-2,4-pentanedione, 100 mL of methylbenzene, and 0.35 g of p-methylbenzenesulfonic acid were placed into a three-neck flask replaced by nitrogen gas, and were mixed uniformly by stirring at room temperature, followed by, at room temperature, a slow dropwise addition of 1.78 g of 2,6-diisopropylaniline. The resulting mixture was subjected to a reflux reaction for 24 hours with water being separated, and then cooled to room temperature. The reactant solution was concentrated under reduced pressure to remove the solvent, followed by an addition of 100 mL of a saturated solution of sodium bicarbonate. The resulted solution was stirred for 2 hours, and then extracted three times with 60 mL of anhydrous ether. The organic phases were mixed together, and dried with anhydrous sodium sulfate. The solvent was removed. The primary product was purified by chromatographic separation, to obtain a yellowish liquid of 1.86 g (the yield was 60%). $^1$H-NMR ($\delta$, ppm, TMS, CDCl$_3$): 7.63-7.60 (1H, m, ArH), 7.06-7.03 (2H, m, ArH), 3.36-3.32 (2H, m, CH), 3.22-3.18 (2H, s, CH$_2$), 1.25-1.22 (6H, m, CH$_3$), 1.16-1.13 (6H, m, CH$_3$), 0.98-0.95 (3H, t, CH$_3$); mass spectrum: FD-MS: 313.

Example 12A

Synthesis of 4-ethyl-5-(2,6-diisopropylphenylimino)-3-heptanone: 2.56 g of 3,5-heptadione, 80 mL of isopropanol, and 0.3 g of acetic acid were placed into a 250 mL three-neck flask replaced by nitrogen gas, and were mixed uniformly by stirring at room temperature, followed by, at room temperature, a slow dropwise addition of 40 mL of isopropanol solution containing 3.56 g of 2,6-diisopropylaniline. The resulting mixture was stirred to react for 2 hours, heated to perform a reflux reaction for 36 hours, and then cooled to room temperature. The reaction solution was concentrated under reduced pressure, to obtain a yellow liquid, which was then purified by chromatographic separation to obtain a yellowish liquid of 3.30 g (the yield was 54%). $^1$H-NMR ($\delta$, ppm, TMS, CDCl$_3$): 7.65-7.62 (1H, m, ArH), 7.16-7.12 (2H, m, ArH), 3.32-3.30 (1H, m, CH), 3.24-3.21 (2H, m, CH), 2.53-2.50 (2H, m, CH$_2$), 1.86-1.82 (4H, m, CH$_2$), 1.26-1.22 (6H, m, CH$_3$), 1.18-1.14 (6H, m, CH$_3$), 1.10-1.08 (3H, t, CH$_3$), 0.90-0.86 (6H, m, CH$_3$); mass spectrum, FD-MS: 315.

Example 13A

Synthesis of 5-(2,6-diisopropylphenylimino)-2-heptanone: 2.56 g of 2,5-heptadione, 80 mL of isopropanol, and 0.4 mL of acetic acid were placed into a 250 mL three-neck flask replaced by nitrogen gas, and were mixed uniformly by stirring at room temperature, followed by, at room temperature, a slow dropwise addition of 40 mL of isopropanol solution containing 3.56 g of 2,6-diisopropylaniline. The resulting mixture was stirred to react for 2 hours, heated to perform a reflux reaction for 24 hours, and then cooled to room temperature. The reaction solution was concentrated under reduced pressure, to obtain a yellow liquid, which was then purified by chromatographic separation to obtain a yellowish liquid of 3.10 g (the yield was 54%). $^1$H-NMR ($\delta$, ppm, TMS, CDCl$_3$): 7.66-7.64 (1H, m, ArH), 7.15-7.12 (2H, m, ArH), 3.20-3.18 (2H, m, CH), 2.50-2.47 (2H, m, CH$_2$), 2.15-2.12 (2H, s, CH$_3$), 1.68-1.66 (2H, m, CH$_2$), 1.48-1.45 (2H, m, CH$_2$), 1.25-1.21 (6H, m, CH$_3$), 1.17-1.14 (6H, m, CH$_3$), 0.96-0.94 (3H, t, CH$_3$); mass spectrum, FD-MS: 287.

Example 14A

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 4-(2,6-diisopropylphenylimino)-2-pentanone (0.006 mol) was added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane was added, and the resulting mixture was washed twice, to obtain a catalyst component of 7.9 g, containing 3.3% Ti, 20.5% Mg, and 51.8% Cl.

Example 15A

Preparation of a catalyst component: The present example was the same as Example 14A, except that 4-(2,6-diisopropylphenylimino)-2-pentanone was substituted with 4-(2,6-dimethylphenylimino)-2-pentanone.

Example 16A

Preparation of a catalyst component: The present example was the same as Example 14A, except that 4-(2,6-diisopropylphenylimino)-2-pentanone was substituted with 4-(2,4,6-trimethylphenylimino)-2-pentanone.

Example 17A

Preparation of a catalyst component: The present example was the same as Example 14A, except that 4-(2,6-diisopropylphenylimino)-2-pentanone was substituted with 4-(2,6-diisopropylphenylimino)-4-phenyl-2-butanone.

Example 18A

Preparation of a catalyst component: The present example was the same as Example 14A, except that 4-(2,6-diisopropylphenylimino)-2-pentanone was substituted with 4-(2,6-diisopropylphenylimino)-1,1,1-trifluoro-2-pentanone.

Example 19A

Preparation of a catalyst component: The present example was the same as Example 14A, except that 4-(2,6-diisopropylphenylimino)-2-pentanone was substituted with 5-(2,6-diisopropylphenylimino)-3-heptanone.

Example 20A

Preparation of a catalyst component: The present example was the same as Example 14A, except that 4-(2,6-diisopropylphenylimino)-2-pentanone was substituted with 4-(1-naphthylimino)-2-pentanone.

Example 21A

Preparation of a catalyst component: The present example was the same as Example 14A, except that 4-(2,6-diisopropylphenylimino)-2-pentanone was substituted with 4-(2-hydroxypropylphenylimino)-2-pentanone.

Example 22A

Preparation of a catalyst component: The present example was the same as Example 14A, except that 4-(2,6-diisopropylphenylimino)-2-pentanone was substituted with 4-ethyl-5-(2,6-diisopropylphenylimino)-3-heptanone.

Example 23A

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 2,4-dibenzoyloxypentane (0.003 mol) and 4-(2,6-diisopropylphenylimino)-2-pentanone (0.003 mol) were added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane was added, and the resulting mixture was washed twice, to obtain a catalyst component of 7.5 g, containing 3.8% Ti, 23.8% Mg, and 52.6% Cl.

Example 24A

Preparation of a catalyst component: The present example was the same as Example 23A, except that 2,4-dibenzoyloxypentane was substituted with 2-isopropyl-2-isopentyl-1,3-dimethoxypropane.

Example 25A

Preparation of a catalyst component: The present example was the same as Example 23A, except that 2,4-dibenzoyloxypentane was substituted with DNBP.

Example 26A

Preparation of a catalyst component: 300 mL of $TiCl_4$ was put into a reactor fully replaced by high-purity nitrogen, and cooled to −20° C., followed by an addition of 7.0 g of alcohol adduct of magnesium chloride (see patent CN1330086A). The resulting mixture was heated with stirring in stages. When the mixture was heated to 40° C., 2,4-dibenzoyloxypentane (0.003 mol) and 4-(2,6-diisopropylphenylimino)-2-pentanone (0.003 mol) were added. The resulting mixture was kept at 40° C. for 2 hours and then filtered, followed by an addition of 100 mL of $TiCl_4$. The resulting mixture was heated to 110° C. and treated three times. After that, 60 mL of hexane was added, and the resulting mixture was washed three times to obtain a catalyst component of 7.2 g, containing 3.4% Ti, 21.2% Mg, and 48.8% Cl.

Example 27A

Preparation of a catalyst component: 300 mL of TiCl$_4$ was put into a reactor fully replaced by high-purity nitrogen, and cooled to −20° C., followed by an addition of 7.0 g of magnesium ethylate. The resulting mixture was heated with stirring in stages. When the mixture was heated to 40° C., 2,4-dibenzoyloxypentane (0.003 mol) and 4-(2,6-diisopropylphenylimino)-2-pentanone (0.003 mol) were added. The resulting mixture was kept at 40° C. for 3 hours and then filtered, followed by an addition of 100 mL of TiCl$_4$. The resulting mixture was heated to 110° C. and treated three times. After that, 60 mL of hexane was added, and the resulting mixture was washed three times to obtain a catalyst component of 6.7 g, containing 3.2% Ti, 24.6% Mg, and 53.2% Cl.

Example 28A

Polymerization reaction of propene: 2.5 mL of AlEt$_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Example 14A and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 1.

Example 29A

Polymerization reaction of propene: The present example was the same as Example 28A, except that the catalyst component was substituted with the catalyst component prepared in Example 15A. Results were shown in Table 1.

Example 30A

Polymerization reaction of propene: The present example was the same as Example 28A, except that the catalyst component was substituted with the catalyst component prepared in Example 16A. Results were shown in Table 1.

Example 31A

Polymerization reaction of propene: The present example was the same as Example 28A, except that the catalyst component was substituted with the catalyst component prepared in Example 17A. Results were shown in Table 1.

Example 32A

Polymerization reaction of propene: The present example was the same as Example 28A, except that the catalyst component was substituted with the catalyst component prepared in Example 18A. Results were shown in Table 1.

Example 33A

Polymerization reaction of propene: The present example was the same as Example 28A, except that the catalyst component was substituted with the catalyst component prepared in Example 19A. Results were shown in Table 1.

Example 34A

Polymerization reaction of propene: The present example was the same as Example 28A, except that the catalyst component was substituted with the catalyst component prepared in Example 20A. Results were shown in Table 1.

Example 35A

Polymerization reaction of propene: The present example was the same as Example 28A, except that the catalyst component was substituted with the catalyst component prepared in Example 21A. Results were shown in Table 1.

Example 36A

Polymerization reaction of propene: The present example was the same as Example 28A, except that the catalyst component was substituted with the catalyst component prepared in Example 22A. Results were shown in Table 1.

Example 37A

Polymerization reaction of propene: The present example was the same as Example 28A, except that the catalyst component was substituted with the catalyst component prepared in Example 23A. Results were shown in Table 1.

Example 38A

Polymerization reaction of propene: The present example was the same as Example 28A, except that the catalyst component was substituted with the catalyst component prepared in Example 24A. Results were shown in Table 1.

Example 39A

Polymerization reaction of propene: The present example was the same as Example 28A, except that the catalyst component was substituted with the catalyst component prepared in Example 25A. Results were shown in Table 1.

Example 40A

Polymerization reaction of propene: The present example was the same as Example 28A, except that the catalyst component was substituted with the catalyst component prepared in Example 26A. Results were shown in Table 1.

Example 41A

Polymerization reaction of propene: The present example was the same as Example 28A, except that the catalyst component was substituted with the catalyst component prepared in Example 27A. Results were shown in Table 1.

Example 42A

Polymerization reaction of propene: The present example was the same as Example 37A, except that the time of the polymerization reaction was extended to 2 hours. Results were shown in Table 1.

Example 43A

Polymerization reaction of propene: The present example was the same as Example 37A, except that the time of the polymerization reaction was extended to 3 hours. Results were shown in Table 1.

Example 44A

Polymerization reaction of propene: The present example was the same as Example 37A, except that the adding amount of hydrogen gas was changed to 7.2 NL. Results were shown in Table 1.

Example 45A

Polymerization reaction of propene: The present example was the same as Example 38A, except that the time of the polymerization reaction was extended to 2 hours. Results were shown in Table 1.

Example 46A

Polymerization reaction of propene: The present example was the same as Example 38A, except that the time of the polymerization reaction was extended to 3 hours. Results were shown in Table 1.

Example 47A

Polymerization reaction of propene: The present example was the same as Example 38A, except that the adding amount of hydrogen gas was changed to 7.2 NL. Results were shown in Table 1.

Comparative Example 1A

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 2,4-dibenzoyloxypentane (0.003 mol) was added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was heated to 110° C., and washed three times with each time lasting for 10 minutes. After that, 60 mL of hexane was added, and the resulting mixture was stirred for 30 minutes. Another 60 mL of hexane was added, and the resulting mixture was washed three times to obtain a catalyst component of 7.4 g, containing 2.4% Ti, 22.0% Mg, and 50.6% Cl.

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the above prepared solid component and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 1.

Comparative Example 2A

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Comparative Example 1A and 7.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 1.

Comparative Example 3A

The present comparative example was the same as Comparative Example 1A, except that the electron donor 2,4-dibenzoyloxypentane added in the preparation of the catalyst component was changed to 2-isopropyl-2-isopentyl-1,3-dimethoxypropane (0.006 mol). Results were shown in Table 1.

Comparative Example 4A

The present comparative example was the same as Comparative Example 3A, except that the time of the polymerization reaction was extended to 2 hours. Results were shown in Table 1.

TABLE 1

| Examples | Activity of Catalyst (Kg polymer/g catalyst) | Isotacticity of Polymer (%) | Melt Index M.I (g/10 min) | Molecular Weight Distribution Mw/Mn |
|---|---|---|---|---|
| 28A | 22.5 | 92.8 | 3.8 | — |
| 29A | 18.8 | 91.8 | 6.3 | — |
| 30A | 20.5 | 93.4 | 4.6 | — |
| 31A | 17.3 | 94.7 | 3.5 | — |
| 32A | 15.8 | 95.3 | 3.2 | 11.8 |
| 33A | 21.4 | 90.8 | 7.9 | — |
| 34A | 22.0 | 95.3 | 3.7 | 10.6 |
| 35A | 30.7 | 93.0 | 5.1 | — |
| 36A | 32.4 | 89.6 | 9.8 | — |
| 37A | 47.1 | 98.2 | 0.8 | 7.8 |
| 38A | 37.8 | 97.6 | 5.3 | 6.5 |
| 39A | 40.3 | 97.3 | 3.8 | 8.0 |
| 40A | 41.6 | 98.3 | 2.9 | — |
| 41A | 43.1 | 97.0 | 3.6 | — |
| 42A | 67.8 | 97.8 | 1.9 | 7.6 |
| 43A | 88.5 | 97.9 | 2.6 | — |
| 44A | 56.6 | 96.1 | 36.1 | — |
| 45A | 62.4 | 97.7 | 5.3 | — |
| 46A | 78.6 | 96.5 | 8.4 | — |
| 47A | 57.0 | 95.2 | 95.6 | — |
| Comparative Example 1A | 44.3 | 97.9 | 2.3 | 6.9 |
| Comparative Example 2A | 45.7 | 95.8 | 20.4 | — |
| Comparative Example 3A | 38.6 | 98.0 | 6.2 | 3.7 |
| Comparative Example 4A | 46.3 | 97.8 | 5.7 | — |

Note:
The symbol "—" in the above Table means that related measurement was not conducted.

The comparison between the above examples and comparative examples shows that, when the catalyst of the present invention is used for polymerization reaction of propene, the catalyst has a high activity and has a long-term activity, and the prepared polymer has an adjustable isotactic index and relatively wide molecular weight distribution.

Example 13B

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, DNBP (0.003 mol) and 4-(2,6-diisopropylphenylimino)-2-pentanone (0.003 mol) were added. The resulting mixture was kept at 80° C. for 1 hour, and filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane was added, and the resulting mixture was washed twice to obtain a catalyst component of 7.2 g, containing 3.7% Ti, 22.8% Mg, and 52.6% Cl.

Example 14B

Preparation of a catalyst component: The present example was the same as Example 13B, except that 4-(2,6-diisopropylphenylimino)-2-pentanone was substituted with 4-(2,6-dimethylphenylimino)-2-pentanone.

Example 15B

Preparation of a catalyst component: The present example was the same as Example 13B, except that 4-(2,6-diisopropylphenylimino)-2-pentanone was substituted with 4-(2,4,6-trimethylphenylimino)-2-pentanone.

Example 16B

Preparation of a catalyst component: The present example was the same as Example 13B, except that 4-(2,6-diisopropylphenylimino)-2-pentanone was substituted with 5-(2,6-diisopropylphenylimino)-3-heptanone.

Example 17B

Preparation of a catalyst component: The present example was the same as Example 13B, except that 4-(2,6-diisopropylphenylimino)-2-pentanone was substituted with 4-(1-naphthylimino)-2-pentanone.

Example 18B

Preparation of a catalyst component: The present example was the same as Example 13B, except that 4-(2,6-diisopropylphenylimino)-2-pentanone was substituted with 4-(2-hydroxypropylphenylimino)-2-pentanone.

Example 19B

Preparation of a catalyst component: The present example was the same as Example 13B, except that DNBP was substituted with DIBP (diisobutyl phthalate).

Example 20B

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, DNBP (0.006 mol) was added. The resulting mixture was kept at 80° C. for 1 hour, and filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane and 4-(2,6-diisopropylphenylimino)-2-pentanone (0.003 mol) were added, and the resulting mixture stirred for 30 minutes, washed with 60 mL of hexane twice to obtain a catalyst component of 7.4 g, containing 3.8% Ti, 23.8% Mg, and 53.6% Cl.

Example 21B

Preparation of a catalyst component: 300 mL of $TiCl_4$ was put into a reactor fully replaced by high-purity nitrogen, and cooled to −20° C., followed by an addition of 7.0 g of alcohol adduct of magnesium chloride (see patent CN1330086A). The resulting mixture was heated with stirring in stages. When the mixture was heated to 40° C., DNBP (0.003 mol) and 4-(2,6-diisopropylphenylimino)-2-pentanone (0.003 mol) were added. The resulting mixture was kept at 40° C. for 2 hours and then filtered, followed by an addition of 100 mL of $TiCl_4$. The resulting mixture was heated to 110° C. and treated three times. After that, 60 mL of hexane was added, and the resulting mixture was washed three times to obtain a catalyst component of 7.2 g, containing 3.4% Ti, 21.2% Mg, and 50.1% Cl.

Example 22B

Preparation of a catalyst component: 300 mL of $TiCl_4$ was put into a reactor fully replaced by high-purity nitrogen, and cooled to −20° C., followed by an addition of 7.0 g of magnesium ethylate. The resulting mixture was heated with stirring in stages. When the mixture was heated to 40° C., DNBP (0.003 mol) and 4-(2,6-diisopropylphenylimino)-2-pentanone (0.003 mol) were added. The resulting mixture was kept at 40° C. for 3 hours and then filtered, followed by an addition of 100 mL of $TiCl_4$. The resulting mixture was heated to 110° C. and treated three times. After that, 60 mL of hexane was added, and the resulting mixture was washed three times to obtain a catalyst component of 6.7 g, containing 3.2% Ti, 24.6% Mg, and 54.3% Cl.

Example 23B

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Example 13B and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 2.

Example 24B

Polymerization reaction of propene: The present example was the same as Example 23B, except that the catalyst component was substituted with the catalyst component prepared in Example 14B. Results were shown in Table 2.

Example 25B

Polymerization reaction of propene: The present example was the same as Example 23B, except that the catalyst component was substituted with the catalyst component prepared in Example 15B. Results were shown in Table 2.

Example 26B

Polymerization reaction of propene: The present example was the same as Example 23B, except that the catalyst component was substituted with the catalyst component prepared in Example 16B. Results were shown in Table 2.

Example 27B

Polymerization reaction of propene: The present example was the same as Example 23B, except that the catalyst component was substituted with the catalyst component prepared in Example 17B. Results were shown in Table 2.

Example 28B

Polymerization reaction of propene: The present example was the same as Example 23B, except that the catalyst component was substituted with the catalyst component prepared in Example 18B. Results were shown in Table 2.

Example 29B

Polymerization reaction of propene: The present example was the same as Example 23B, except that the catalyst component was substituted with the catalyst component prepared in Example 19B. Results were shown in Table 2.

Example 30B

Polymerization reaction of propene: The present example was the same as Example 23B, except that the catalyst component was substituted with the catalyst component prepared in Example 20B. Results were shown in Table 2.

Example 31B

Polymerization reaction of propene: The present example was the same as Example 23B, except that the catalyst component was substituted with the catalyst component prepared in Example 21B. Results were shown in Table 2.

Example 32B

Polymerization reaction of propene: The present example was the same as Example 23B, except that the catalyst component was substituted with the catalyst component prepared in Example 22B. Results were shown in Table 2.

Example 33B

Polymerization reaction of propene: The present example was the same as Example 23B, except that the time of the polymerization reaction was extended to 2 hours. Results were shown in Table 2.

Example 34B

Polymerization reaction of propene: The present example was the same as Example 23B, except that the time of the polymerization reaction was extended to 3 hours. Results were shown in Table 2.

Example 35B

Polymerization reaction of propene: The present example was the same as Example 30B, except that the time of the polymerization reaction was extended to 2 hours. Results were shown in Table 2.

Example 36B

Polymerization reaction of propene: The present example was the same as Example 30B, except that the time of the polymerization reaction was extended to 3 hours. Results were shown in Table 2.

Example 37B

Polymerization reaction of propene: The present example was the same as Example 23B, except that the adding amount of hydrogen gas was changed to 7.2 NL. Results were shown in Table 2.

Comparative Example 1B

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, DNBP (0.006 mol) was added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was heated to 110° C., and washed three times with each time lasting for 10 minutes. After that, 60 mL of hexane was added, and the resulting mixture was stirred for 30 minutes. Another 60 mL of hexane was added, and the resulting mixture was washed three times to obtain a catalyst component of 7.4 g, containing 2.4% Ti, 22.0% Mg, and 50.6% Cl.

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the above prepared solid component and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 2.

Comparative Example 2B

Polymerization reaction of propene: 2.5 mL of AlEt$_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Comparative Example 1B and 7.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 2.

TABLE 2

| Examples | Activity of Catalyst (Kg polymer/g catalyst) | Isotacticity of Polymer (%) | Melt Index M.I (g/10 min) | Molecular Weight Distribution Mw/Mn |
|---|---|---|---|---|
| 23B | 44.7 | 97.8 | 2.2 | 6.8 |
| 24B | 52.3 | 98.1 | 1.1 | 6.3 |
| 25B | 48.0 | 98.2 | 1.1 | 6.2 |
| 26B | 50.1 | 98.3 | 1.0 | 7.1 |
| 27B | 43.6 | 97.8 | 1.2 | 7.0 |
| 28B | 45.6 | 97.8 | 1.0 | 7.0 |
| 29B | 42.5 | 97.9 | 0.9 | 6.3 |
| 30B | 48.0 | 97.8 | 1.4 | 6.6 |
| 31B | 45.8 | 96.9 | 3.9 | 8.0 |
| 32B | 47.2 | 97.8 | 3.2 | 7.8 |
| 33B | 66.2 | 97.7 | 1.3 | — |
| 34B | 87.5 | 98.1 | 1.0 | — |
| 35B | 60.8 | 97.8 | 1.2 | — |
| 36B | 78.7 | 97.6 | 1.5 | — |
| 37B | 62.0 | 95.2 | 42.1 | — |
| Comparative Example 1B | 38.5 | 98.0 | 2.2 | 3.8 |
| Comparative Example 2B | 43.8 | 96.3 | 28.6 | — |
| Comparative Example 3B | 46.6 | 98.1 | 2.5 | — |

Note:
The symbol "—" in the above Table means that related measurement was not conducted.

The comparison between the above Examples 22B-37B and Comparative Examples 1B-3B shows that, when a catalyst that uses an imine compound with a ketone group shown in Formula I and an aromatic carboxylic acid ester compound shown in Formula II as a composite internal electron donor is used for polymerization reaction of propene, the catalyst has significantly improved hydrogen response and high activity and a long-term activity, and the polymer prepared has relatively wide molecular weight distribution.

Example 13C

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of TiCl$_4$ within 1 hour. The resulting solution was slowly heated to 80° C. to gradually precipitate a solid. Then, 2,4-dibenzoyloxypentane (0.003 mol) and 4-(2,6-diisopropylphenylimino)-2-pentanone (0.003 mol) were added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane was added, and the resulting mixture was washed twice to obtain a catalyst solid component of 7.9 g, containing 3.7% Ti, 22.8% Mg, and 52.8% Cl.

Example 14C

Preparation of a catalyst component: The present example was the same as Example 13C, except that 4-(2,6-diisopropylphenylimino)-2-pentanone was substituted with 4-(2,6-dimethylphenylimino)-2-pentanone.

Example 15C

Preparation of a catalyst component: The present example was the same as Example 13C, except that 4-(2,6-diisopropylphenylimino)-2-pentanone was substituted with 4-(2,4,6-trimethylphenylimino)-2-pentanone.

Example 16C

Preparation of a catalyst component: The present example was the same as Example 13C, except that 4-(2,6-diisopropylphenylimino)-2-pentanone was substituted with 4-phenyl-4-(2,6-diisopropylphenylimino)-2-butanone.

Example 17C

Preparation of a catalyst component: The present example was the same as Example 13C, except that 4-(2,6-diisopropylphenylimino)-2-pentanone was substituted with 5-(2,6-diisopropylphenylimino)-3-heptanone.

Example 18C

Preparation of a catalyst component: The present example was the same as Example 13C, except that 4-(2,6-diisopropylphenylimino)-2-pentanone was substituted with 4-(1-naphthylimino)-2-pentanone.

Example 19C

Preparation of a catalyst component: The present example was the same as Example 13C, except that 4-(2,6-diisopropylphenylimino)-2-pentanone was substituted with 4-(2-hydroxypropylphenylimino)-2-pentanone.

Example 20C

Preparation of a catalyst component: The present example was the same as Example 13C, except that 4-(2,6-diisopropylphenylimino)-2-pentanone was substituted with 4-ethyl-5-(2,6-diisopropylphenylimino)-3-heptanone.

Example 21C

Preparation of a catalyst component: The present example was the same as Example 13C, except that 2,4-dibenzoyloxypentane was substituted with 2,4-bis(n-butylbenzoyloxy)pentane.

Example 22C

Preparation of a catalyst component: 300 mL of $TiCl_4$ was put into a reactor fully replaced by high-purity nitrogen, and cooled to −20° C., followed by an addition of 7.0 g of alcohol adduct of magnesium chloride (see patent CN1330086A). The resulting mixture was heated with stirring in stages. When the mixture was heated to 40° C., 2,4-dibenzoyloxypentane (0.003 mol) and 4-(2,6-diisopropylphenylimino)-2-pentanone (0.003 mol) were added. The resulting mixture was kept at 40° C. for 2 hours and then filtered, followed by an addition of 100 mL of $TiCl_4$. The resulting mixture was heated to 110° C. and treated three times. After that, 60 mL of hexane was added, and the resulting mixture was washed three times to obtain a catalyst component of 7.2 g, containing 3.4% Ti, 21.2% Mg, and 50.1% Cl.

Example 23C

Preparation of a catalyst component: 300 mL of $TiCl_4$ was put into a reactor fully replaced by high-purity nitrogen, and cooled to −20° C., followed by an addition of 7.0 g of magnesium ethylate. The resulting mixture was heated with stirring in stages. When the mixture was heated to 40° C., 2,4-dibenzoyloxypentane (0.003 mol) and 4-(2,6-diisopropylphenylimino)-2-pentanone (0.003 mol) were added. The resulting mixture was kept at 40° C. for 3 hours and then filtered, followed by an addition of 100 mL of $TiCl_4$. The resulting mixture was heated to 110° C. and treated three times. After that, 60 mL of hexane was added, and the resulting mixture was washed three times to obtain a catalyst component of 6.7 g, containing 3.2% Ti, 24.6% Mg, and 54.3% Cl.

Example 24C

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Example 13C and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 3.

Example 25C

Polymerization reaction of propene: The present example was the same as Example 24C, except that the catalyst component was substituted with the catalyst component prepared in Example 14C. Results were shown in Table 3.

Example 26C

Polymerization reaction of propene: The present example was the same as Example 24C, except that the catalyst component was substituted with the catalyst component prepared in Example 15C. Results were shown in Table 3.

Example 27C

Polymerization reaction of propene: The present example was the same as Example 24C, except that the catalyst component was substituted with the catalyst component prepared in Example 16C. Results were shown in Table 3.

Example 28C

Polymerization reaction of propene: The present example was the same as Example 24C, except that the catalyst component was substituted with the catalyst component prepared in Example 17C. Results were shown in Table 3.

Example 29C

Polymerization reaction of propene: The present example was the same as Example 24C, except that the catalyst component was substituted with the catalyst component prepared in Example 18C. Results were shown in Table 3.

Example 30C

Polymerization reaction of propene: The present example was the same as Example 24C, except that the catalyst component was substituted with the catalyst component prepared in Example 19C. Results were shown in Table 3.

Example 31C

Polymerization reaction of propene: The present example was the same as Example 24C, except that the catalyst component was substituted with the catalyst component prepared in Example 20C. Results were shown in Table 3.

Example 32C

Polymerization reaction of propene: The present example was the same as Example 24C, except that the catalyst component was substituted with the catalyst component prepared in Example 21C. Results were shown in Table 3.

Example 33C

Polymerization reaction of propene: The present example was the same as Example 24C, except that the catalyst component was substituted with the catalyst component prepared in Example 22C. Results were shown in Table 3.

Example 34C

Polymerization reaction of propene: The present example was the same as Example 24C, except that the catalyst component was substituted with the catalyst component prepared in Example 23C. Results were shown in Table 3.

Example 35C

Polymerization reaction of propene: The present example was the same as Example 24C, except that the time of the polymerization reaction was extended to 2 hours. Results were shown in Table 3.

Example 36C

Polymerization reaction of propene: The present example was the same as Example 24C, except that the time of the polymerization reaction was extended to 3 hours. Results were shown in Table 3.

Example 37C

Polymerization reaction of propene: The present example was the same as Example 25C, except that the time of the polymerization reaction was extended to 2 hours. Results were shown in Table 3.

Example 38C

Polymerization reaction of propene: The present example was the same as Example 25C, except that the time of the polymerization reaction was extended to 3 hours. Results were shown in Table 3.

Example 39C

Polymerization reaction of propene: The present example was the same as Example 25C, except that the adding amount of hydrogen gas was changed to 7.2 NL. Results were shown in Table 3.

Comparative Example 1C

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 2,4-dibenzoyloxypentane (0.003 mol) was added. The resulting mixture was kept at 80° C. for 1 hour, and filtered thermally, followed by an addition of 150 mL of methylbenzene. The resulting mixture was washed twice to obtain a solid. Then, 100 mL of methylbenzene was added, and the resulting mixture was heated to 110° C., and washed three times with each time lasting for 10 minutes. After that, 60 mL of hexane was added, and the resulting mixture was stirred for 30 minutes. Another 60 mL of hexane was added, and the resulting mixture was washed three times to obtain a catalyst component of 7.4 g, containing 2.4% Ti, 22.0% Mg, and 50.6% Cl.

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the above prepared solid component and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 3.

Comparative Example 2C

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Comparative Example 1C and 7.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 3.

TABLE 3

| Examples | Activity of Catalyst (Kg Polymer/g Catalyst) | Isotacticity of Polymer (%) | Melt Index M.I (g/10 min) | Molecular Weight Distribution Mw/Mn |
|---|---|---|---|---|
| 24C | 47.2 | 98.2 | 0.9 | 7.9 |
| 25C | 48.3 | 97.6 | 1.3 | 8.0 |
| 26C | 46.0 | 97.8 | 1.1 | 8.0 |
| 27C | 45.6 | 97.8 | 0.8 | 7.9 |
| 28C | 52.7 | 98.0 | 1.5 | 8.3 |
| 29C | 46.1 | 98.1 | 1.0 | 8.2 |
| 30C | 49.5 | 98.2 | 0.9 | 8.1 |
| 31C | 41.6 | 97.6 | 2.6 | 8.3 |
| 32C | 47.1 | 98.0 | 2.2 | 8.0 |
| 33C | 50.1 | 97.5 | 3.0 | 8.4 |
| 34C | 44.7 | 96.8 | 1.2 | 8.6 |
| 35C | 67.8 | 97.8 | 2.9 | — |
| 36C | 89.5 | 98.0 | 3.1 | — |
| 37C | 60.8 | 97.6 | 1.2 | — |
| 38C | 85.7 | 97.8 | 1.1 | — |
| 39C | 56.6 | 96.1 | 32.1 | — |
| Comparative Example 1C | 44.3 | 97.9 | 2.3 | 6.9 |
| Comparative Example 2C | 45.7 | 95.8 | 20.4 | — |

Note:
The symbol "—" in the above Table means that related measurement was not conducted.

The comparison between the above Examples 24C-39C and Comparative Examples 1C-2C shows that, when a catalyst that uses an imine compound with a ketone group shown in Formula I and a diol ester compound shown in Formula III as a composite internal electron donor is used for polymerization reaction of propene, the catalyst has a high activity and a good hydrogen response and a long-term activity, and the polymer prepared has a high isotactic index and relatively wide molecular weight distribution.

Example 14D

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 2-isopropyl-2-isopentyl-1,3-dimethoxypropane (0.003 mol) and 4-(2,6-diisopropylphenylimino)-2-pentanone (0.006 mol) were added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane was added, and the resulting mixture was washed twice to obtain a catalyst component of 7.6 g, containing 3.0% Ti, 20.5% Mg, and 51.4% Cl.

Example 15D

Preparation of a catalyst component: The present example was the same as Example 14D, except that 4-(2,6-diisopropylphenylimino)-2-pentanone was substituted with 4-(2,6-dimethylphenylimino)-2-pentanone.

Example 16D

Preparation of a catalyst component: The present example was the same as Example 14D, except that 4-(2,6-diisopropylphenylimino)-2-pentanone was substituted with 4-(2,4,6-trimethylphenylimino)-2-pentanone.

Example 17D

Preparation of a catalyst component: The present example was the same as Example 14D, except that 4-(2,6-diisopropylphenylimino)-2-pentanone was substituted with 4-(2,6-diisopropylphenylimino)-1,1,1-trifluoro-2-pentanone.

Example 18D

Preparation of a catalyst component: The present example was the same as Example 14D, except that 4-(2,6-diisopropylphenylimino)-2-pentanone was substituted with 5-(2,6-diisopropylphenylimino)-3-heptanone.

Example 19D

Preparation of a catalyst component: The present example was the same as Example 14D, except that 4-(2,6-diisopropylphenylimino)-2-pentanone was substituted with 4-(2-hydroxypropylphenylimino)-2-pentanone.

Example 20D

Preparation of a catalyst component: The present example was the same as Example 14D, except that 2-isopropyl-2-isopentyl-1,3-dimethoxypropane was substituted with 9,9'-di(methoxymethyl)fluorene.

Example 21D

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of TiCl$_4$ within 1 hour. The resulting solution was slowly heated to 80° C. to gradually precipitate a solid. Then, 2-isopropyl-2-isopentyl-1,3-dimethoxypropane (0.006 mol) was added. The resulting mixture was kept at 80° C. for 1 hour, and filtered thermally, followed by an addition of 150 mL of methylbenzene. The resulting mixture was washed twice to obtain a solid. Then, 100 mL of methylbenzene was added, and the resulting mixture was stirred for 30 minutes, heated to 110° C., and washed three times with each time lasting for 10 minutes. After that, 60 mL of hexane and the compound 4-(2,6-diisopropylphenylimino)-2-pentanone (0.003 mol) were added, and the resulting mixture was stirred for 30 minutes, washed with another 60 mL of hexane twice to obtain a catalyst component of 7.8 g, containing 3.6% Ti, 22.0% Mg, and 52.3% Cl.

Example 22D

Preparation of a catalyst component: 300 mL of TiCl$_4$ was put into a reactor fully replaced by high-purity nitrogen, and cooled to −20° C., followed by an addition of 7.0 g of alcohol adduct of magnesium chloride (see patent CN1330086A). The resulting mixture was heated with stirring in stages. When the mixture was heated to 40° C., 2-isopropyl-2-isopentyl-1,3-dimethoxypropane (0.003 mol) and 4-(2,6-diisopropylphenylimino)-2-pentanone (0.003 mol) were added. The resulting mixture was kept at 40° C. for 2 hours and then filtered, followed by an addition of 100 mL of TiCl$_4$. The resulting mixture was heated to 110° C. and treated three times. After that, 60 mL of hexane was added, and the resulting mixture was washed three times to obtain a catalyst component of 7.2 g, containing 3.4% Ti, 23.7% Mg, and 53.0% Cl.

Example 23D

Preparation of a catalyst component: 300 mL of TiCl$_4$ was put into a reactor fully replaced by high-purity nitrogen, and cooled to −20° C., followed by an addition of 7.0 g of magnesium ethylate. The resulting mixture was heated with stirring in stages. When the mixture was heated to 40° C., 2-isopropyl-2-isopentyl-1,3-dimethoxypropane (0.003 mol) and 4-(2,6-diisopropylphenylimino)-2-pentanone (0.003 mol) were added. The resulting mixture was kept at 40° C. for 3 hours and then filtered, followed by an addition of 100 mL of TiCl$_4$. The resulting mixture was heated to 110° C. and treated three times. After that, 60 mL of hexane was added, and the resulting mixture was washed three times to obtain a catalyst component of 6.7 g, containing 3.2% Ti, 21.6% Mg, and 52.0% Cl.

Example 24D

Polymerization reaction of propene: 2.5 mL of AlEt$_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the solid component prepared in Example 14D and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 4.

Example 25D

Polymerization reaction of propene: The present example was the same as Example 24D, except that the catalyst component was substituted with the catalyst component prepared in Example 15D. Results were shown in Table 4.

Example 26D

Polymerization reaction of propene: The present example was the same as Example 24D, except that the catalyst component was substituted with the catalyst component prepared in Example 16D. Results were shown in Table 4.

Example 27D

Polymerization reaction of propene: The present example was the same as Example 24D, except that the catalyst component was substituted with the catalyst component prepared in Example 17D. Results were shown in Table 4.

Example 28D

Polymerization reaction of propene: The present example was the same as Example 24D, except that the catalyst component was substituted with the catalyst component prepared in Example 18D. Results were shown in Table 4.

Example 29D

Polymerization reaction of propene: The present example was the same as Example 24D, except that the catalyst component was substituted with the catalyst component prepared in Example 19D. Results were shown in Table 4.

Example 30D

Polymerization reaction of propene: The present example was the same as Example 24D, except that the catalyst component was substituted with the catalyst component prepared in Example 20D. Results were shown in Table 4.

Example 31D

Polymerization reaction of propene: The present example was the same as Example 24D, except that the catalyst component was substituted with the catalyst component prepared in Example 21D. Results were shown in Table 4.

Example 32D

Polymerization reaction of propene: The present example was the same as Example 24D, except that the catalyst component was substituted with the catalyst component prepared in Example 22D. Results were shown in Table 4.

Example 33D

Polymerization reaction of propene: The present example was the same as Example 24D, except that the catalyst component was substituted with the catalyst component prepared in Example 23D. Results were shown in Table 4.

Example 34D

Polymerization reaction of propene: The present example was the same as Example 24D, except that the time of the polymerization reaction was extended to 2 hours. Results were shown in Table 4.

Example 35D

Polymerization reaction of propene: The present example was the same as Example 24D, except that the time of the polymerization reaction was extended to 3 hours. Results were shown in Table 4.

Example 36D

Polymerization reaction of propene: The present example was the same as Example 24D, except that the adding amount of hydrogen was changed to 7.2 NL. Results were shown in Table 4.

Example 37D

Polymerization reaction of propene: The present example was the same as Example 31D, except that the time of the polymerization reaction was extended to 2 hours. Results were shown in Table 4.

Example 38D

Polymerization reaction of propene: The present example was the same as Example 31D, except that the time of the polymerization reaction was extended to 3 hours. Results were shown in Table 4.

Example 39D

Polymerization reaction of propene: The present example was the same as Example 31D, except that the adding amount of hydrogen was changed to 7.2 NL. Results were shown in Table 4.

Comparative Example 1D

Preparation of a catalyst component: 4.8 g of magnesium chloride, 95 mL of methylbenzene, 4 mL of epoxy chloropropane, and 12.5 mL of tributyl phosphate (TBP) were put one by one into a reactor fully replaced by high-purity nitrogen gas, and were heated with stirring to 50° C. and kept at 50° C. for 2.5 hours. After the solid was completely dissolved, 1.4 g of phthalic anhydride was added. The resulting solution was still kept at 50° C. for 1 hour, and then cooled to a temperature below −25° C., followed by a dropwise addition of $TiCl_4$ within 1 hour. The resulting solution was slowly heated to 80° C. to gradually precipitate a solid. Then, 2-isopropyl-2-isopentyl-1,3-dimethoxypropane (0.006 mol) was added. The resulting mixture was kept at 80° C. for 1 hour, and was filtered thermally, followed by an addition of 150 mL of methylbenzene. The resulting mixture was washed twice to obtain a solid. Then, 100 mL of methylbenzene was added, and the resulting mixture was heated to 110° C., and washed three times with each time lasting for 10 minutes. After that, 60 mL of hexane was added, and the resulting mixture was stirred for 30 minutes. Another 60 mL of hexane was added, and the resulting mixture was washed three times to obtain a catalyst component of 7.4 g, containing 2.4% Ti, 24.6% Mg, and 55.6% Cl.

Polymerization reaction of propene: 2.5 mL of $AlEt_3$ and 5 mL of cyclohexyl methyl dimethoxy silane (CHMMS) enabling Al/Si (mol)=25 were placed into a 5 L stainless reactor replaced fully by propene gas, followed by an addition of 10 mg of the above prepared solid component and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 4.

Comparative Example 2D

Polymerization reaction of propene: 2.5 mL of $AlEt_3$ and 5 mL of cyclohexyl methyl dimethoxy silane (CHMMS)

enabling Al/Si (mol)=25 were placed into a 5 L stainless reactor replaced fully by propene gas, followed by an addition of 10 mg of the solid component prepared in Comparative Example 1D and 1.2 NL of hydrogen gas, and an introduction of 2.5 L of liquid propene. The resulting mixture was heated to 70° C. and maintained at 70° C. for 1 hour, followed by cooling, pressure releasing, and discharging, to obtain a PP resin. Results were shown in Table 4.

TABLE 4

| Examples | Activity of Catalyst (Kg Polymer/g Catalyst) | Isotacticity of Polymer (%) | Melt Index M.I (g/10 min) | Molecular Weight Distribution Mw/Mn |
|---|---|---|---|---|
| 24D | 41.6 | 97.9 | 5.6 | 6.6 |
| 25D | 38.9 | 97.7 | 5.4 | 6.5 |
| 26D | 45.8 | 97.8 | 5.5 | 6.4 |
| 27D | 43.5 | 97.8 | 5.7 | 6.3 |
| 28D | 39.8 | 97.9 | 5.4 | 6.5 |
| 29D | 42.8 | 97.8 | 5.2 | 6.2 |
| 30D | 50.2 | 98.1 | 5.9 | 6.8 |
| 31D | 40.8 | 98.0 | 5.2 | 6.8 |
| 32D | 47.8 | 98.2 | 6.2 | 7.3 |
| 33D | 47.1 | 98.3 | 6.5 | 7.0 |
| 34D | 63.7 | 97.8 | 5.9 | — |
| 35D | 78.2 | 97.9 | 5.6 | — |
| 36D | 57.0 | 95.3 | 95.6 | — |
| 37D | 66.4 | 97.8 | 5.3 | — |
| 38D | 80.8 | 97.5 | 8.4 | — |
| 39D | 55.8 | 95.2 | 96.2 | — |
| Comparative Example 1D | 38.6 | 98.0 | 6.2 | 3.7 |
| Comparative Example 2D | 46.3 | 97.8 | 5.7 | — |

Note:
The symbol "—" in the above Table means that related measurement was not conducted.

The comparison between the above Examples 24D-39D and Comparative Examples 1D-2D shows that, when a catalyst that uses an imine compound with a ketone group shown in Formula I and a diether compound shown in Formula IV as a composite internal electron donor is used for polymerization reaction of propene, the catalyst has a high activity and a long-term activity, and the polymer prepared has a high isotactic index and relatively wide molecular weight distribution.

It should be noted that the examples above are provided only for illustrating the present invention, rather than limiting the present invention in any way. Variations and amendments can be made to the present invention based on the disclosure of the claims and within the scope and spirit of the present invention. Although the above descriptions about the present invention involve particular methods, materials, and implementing examples, it does not means that the present invention is limited to the presently disclosed examples. On the contrary, the present invention can be extended to other methods and applications having same functions as those of the present invention.

The invention claimed is:

1. A catalyst component for olefin polymerization, comprising magnesium, titanium, halogen, and an internal electron donor, wherein the internal electron donor comprises an imine compound with a ketone group as shown in Formula I,

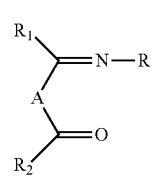

Formula I wherein, in Formula I, R is selected from flail the group consisting of hydroxyl, $C_1$-$C_{20}$ alkyl with or without a halogen atom substitute, $C_2$-$C_{20}$ alkenyl with or without a halogen atom substitute group, and $C_6$-$C_{30}$ aryl with or without a halogen atom substitute group; $R_1$ and $R_2$ are identical to or different from each other, each independently selected from flail the group consisting of hydrogen, $C_1$-$C_{20}$ alkyl, $C_2$-$C_{20}$ alkenyl, $C_1$-$C_{20}$ alkoxy, $C_6$-$C_{30}$ arylalkyl, $C_6$-$C_{30}$ alkylaryl, $C_9$-$C_{40}$ fused aryl, halogen atoms, and hydroxyl; A is $(CR_3R_4)_n$ or a heteroatom, wherein $R_3$ and $R_4$ are identical to or different from each other, each independently selected from flail the group consisting of hydrogen, $C_1$-$C_{20}$ alkyl, $C_2$-$C_{20}$ alkenyl, $C_6$-$C_{30}$ arylalkyl, $C_6$-$C_{30}$ alkylaryl, and $C_9$-$C_{40}$ fused aryl, and n is 0, 1, 2, 3, 4, 5, or 6.

2. The catalyst component according to claim 1, wherein, based on the weight of the catalyst component, a content of magnesium is in a range of 5 wt %-50 wt %, a content of titanium is in a range of 1.0 wt %-8.0 wt %, a content of halogen is in a range of 10 wt %-70 wt %, and a content of the internal electron donor is in a range of 0.1 wt %-20 wt %.

3. The catalyst component according to claim 1, wherein R is methyl, ethyl, n-propyl, isopropyl, n-butyl, isobutyl, sec-butyl, tert-butyl, pentyl, hexyl, hydroxyalkyl, phenyl, halogenated phenyl, alkyl-substituted phenyl, naphthyl, biphenyl, or a heterocycle-containing group.

4. The catalyst component according to claim 1, wherein each of $R_1$, $R_2$, $R_3$, and $R_4$ is independently selected from the group consisting of methyl, ethyl, n-propyl, isopropyl, n-butyl, isobutyl, sec-butyl, tert-butyl, and pentyl.

5. The catalyst component according to claim 1, wherein the heteroatom is halogen, nitrogen, oxygen, phosphorus, or silicon atom.

6. The catalyst component according to claim 1, wherein the imine compound with a ketone group as shown in Formula I is one or more selected from the following compounds: 4-butylimino-2-pentanone, 4-pentylimino-2-pentanone, 4-hexylimino-2-pentanone, 4-octylimino-2-pentanone, 4-[(1-hydroxymethyl)propylimino]-2-pentanone, 4-hydroxypropylimino-2-pentanone, 4-hydroxyethylimino-2-pentanone, 4-hydroxybutylimino-2-pentanone, 4-isopropylimino-2-pentanone, 4-(4-chlorophenylimino)-2-pentanone, 4-(2,4-dichlorophenylimino)-2-pentanone, 4-(4-trifluoromethylphenylimino)-2-pentanone, 4-phenylimino-2-pentanone, 4-(1-naphthylimino)-2-pentanone, 4-(2-naphthylimino)-2-pentanone, 4-(2,6-dimethylphenylimino)-2-pentanone, 4-(2-hydroxypropylphenylimino)-2-pentanone, 4-(2,6-diisopropylphenylimino)-2-pentanone, 4-(2,4,6-trimethylphenylimino)-2-pentanone, 4-(8-quinolylimino)-2-pentanone, 4-(4-quinolylimino)-2-pentanone, 4-(3-quinolylimino)-2-pentanone, 4-(2-chloro-6-hydroxyphenylimino)-2-pentanone, 1,1,1-trifluoro-4-(2,6-diisopropylphenylimino)-2-pentanone, 1,1,1-trifluoro-4-(2,6-dimethylphenylimino)-2-pentanone, 3-methyl-4-(2,6-dimethylphenylimino)-2-pentanone, 3-ethyl-4-(2,6- dimethylphenylimino)-2-pentanone, 3-isopropyl-4-(2,6-dimethylphenylimino)-2-pentanone, 3-butyl-4-(2,6-dimethylphenylimino)-2-pentanone, 3-methyl-4-(2,6-diisopropylphenylimino)-2-pentanone, 3-ethyl-4-(2,6-diisopropylphenylimino)-2-pentanone, 3-isopropyl-4-(2,6-diisopropylphenylimino)-2-pentanone, 3-butyl-4-(2,6-diisopropylphenylimino)-2-pentanone, 1-(2-furyl)-3-(2,6-diisopropylphenylimino)-4,4,4-trifluoro-1-butanone, 1-(2-furyl)-3-(8-quinolylimino)-4,4,4-trifluoro-1-butanone, 1-(2-furyl)-3-(2,6-dimethylphenylimino)-4,4,4-trifluoro-1-butanone, 2-hexylimino-4-heptanone, 2-isopropylimino-4-heptanone, 4-hexylimino-2-heptanone, 4-isopropylimino-2-heptanone, 4-(2-trimethylsilyl)ethylimino-2-pentanone, 5-phenylimino-3-heptanone, 5-(1-naphthylimino)-3-heptanone, 5-(2-naphthylimino)-3-heptanone, 5-(8-quinolylimino)-3-heptanone, 5-(4-quinolylimino)-3-heptanone, 5-(3-quinolylimino)-3-heptanone, 5-(2,6-diisopropylphenylimino)-3-heptanone, 5-(2,6-dimethylphenylimino)-3-heptanone, 5-butylimino-3-heptanone, 5-isopropylimino-3-heptanone, 5-hydroxyethylimino-3-heptanone, 5-hydroxybutylimino-3-heptanone, 4-ethyl-5-(8-quinolylimino)-3-heptanone, 4-methyl-5-(8-quinolylimino)-3-heptanone, 4-ethyl-5-(1-naphthylimino)-3-heptanone, 4-ethyl-5-(2-naphthylimino)-3-heptanone, 4-ethyl-5-phenylimino-3-heptanone, 4-butyl-5-phenylimino-3-heptanone, 4-methyl-5-(2,6-diisopropylphenylimino)-3-heptanone, 4-ethyl-5-(2,6-diisopropylphenylimino)-3-heptanone, 4-isopropyl-5-(2,6-diisopropylphenylimino)-3-heptanone, 4-butyl-5-(2,6-diisopropylphenylimino)-3-heptanone, 4-methyl-5-(2,6-dimethylphenylimino)-3-heptanone, 4-ethyl-5-(2,6-dimethylphenylimino)-3-heptanone, 3-isopropylimino-5-octanone, 3-(2,6-diisopropylphenylimino)-5-octanone, 5-isopropylimino-3-octanone, 6-isopropylimino-4-octanone, 5-(2,6-diisopropylphenylimino)-2-heptanone, 5-(2,4,6-trimethylphenylimino)-2-heptanone, 4-methyl-5-(2,6-dimethylphenylimino)-2-heptanone, 4-ethyl-6-(2,6-diisopropylphenylimino)-2-heptanone, 4-isopropyl-6-(2,6-diisopropylphenylimino)-2-heptanone, 6-(2,6-dimethylphenylimino)-3-octanone, 3-(2,6-diisopropylphenylimino)-1,3-diphenyl-1-acetone, 4-(2,6-diisopropylphenylimino)-4-phenyl-2-butanone, dimethylphenylimino)-1,3-diphenyl-1-acetone, 3-(2,6-diisopropylphenylimino)-1-phenyl-1-butanone, 3-(2,6-dimethylphenylimino)-1-phenyl-1-butanone, 3-(8-quinolylimino)-1,3-diphenyl-1-acetone, and 3-(3-quinolylimino)-1,3-diphenyl-1-acetone.

7. The catalyst component according to claim 1, wherein the internal electron donor further comprises at least one additional electron donor compound selected from the group consisting of aromatic carboxylate ester compounds, diol ester compounds, diether compounds, and mixtures thereof.

8. The catalyst component according to claim 7, wherein a molar ratio of the imine compound with a ketone group as shown in Formula I to the additional electron donor compound is in a range of 1:(0.05-20).

9. The catalyst component according to claim 7, wherein the aromatic carboxylate ester compound is as shown in Formula II,

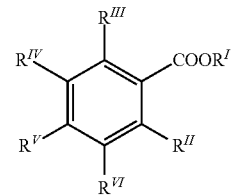

Formula II wherein in Formula II, $R^I$ is $C_1$-$C_{20}$ alkyl with or without a halogen atom substitute, $C_2$-$C_{20}$ alkenyl with or without a halogen atom substitute, $C_2$-$C_{20}$ alkynyl with or without a halogen atom substitute, or $C_6$-$C_{30}$ alkylaryl with or without a halogen atom substitute;
is $C_1$-$C_{20}$ alkyl, $C_2$-$C_{20}$ alkenyl, $C_2$-$C_{20}$ alkynyl, or $C_6$-$C_{30}$ alkylaryl or ester group or amido group; $R^{III}$, $R^{IV}$, $R^V$, and $R^{VI}$ are identical to or different from each other, each independently selected from the group consisting of $C_1$-$C_{20}$ alkyl, $C_2$-$C_{20}$ alkenyl, $C_2$-$C_{20}$ alkynyl, $C_1$-$C_{20}$ alkoxy, $C_6$-$C_{30}$ arylalkyl, $C_6$-$C_{30}$ alkylaryl, $C_9$-$C_{40}$ fused aryl, and halogen;
the diol ester compound is as shown in Formula III,

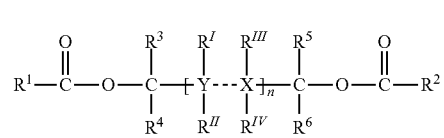

Formula III wherein in Formula III, each of X and Y is independently selected from the group consisting of carbon, oxygen, sulfur, nitrogen, boron, and silicon; $R^1$ and $R^2$ are identical to or different from each other, each independently selected from the group consisting of halogen, alkyl, cycloalkyl, aryl, alkenyl, fused aryl, and ester group; $R^3$-$R^6$ are identical to or different from each other, each independently selected from Hall the group consisting of hydrogen, substituted or unsubstituted alkyl, substituted or unsubstituted cycloalkyl, substituted or unsubstituted aryl, substituted or unsubstituted alkenyl, substituted or unsubstituted fused aryl, and substituted or unsubstituted ester group; $R^I$-$R^{IV}$ are identical to or different from each other, each independently selected from the group consisting of hydrogen, substituted or unsubstituted alkyl, substituted or unsubstituted cycloalkyl, substituted or unsubstituted aryl, substituted or unsubstituted alkenyl, substituted or unsubstituted fused aryl, and substituted or unsubstituted ester group; $R^3$-$R^6$ and $R^I$-$R^{IV}$ each optionally contains one or more heteroatoms as a substitute of a carbon or hydrogen atom or both, the heteroatom being oxygen, sulfur, nitrogen, boron, silicon, phosphorus, or a halogen atom; one or more of $R^3$-$R^6$, and $R^I$ to $R^{IV}$ are bonded together to form a ring; and n is an integer ranging from 1 to 10; and/or
the diether compound is as shown in Formula IV,

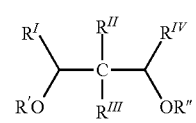

Formula IV wherein in Formula IV, R' and R" are identical to or different from each other, each independently selected from the group consisting of $C_1$-$C_{20}$ hydrocarbyls; n is an integer ranging from 0 to 6; $R^I$-$R^{IV}$ are identical to or different from each other, each independently selected from the group consisting of hydrogen, alkoxy, substituted amino, halogen atoms, $C_1$-$C_{20}$ hydrocarbyl, and $C_6$-$C_{20}$ aryl, and optionally two or more of $R^I$-$R^{IV}$ are bonded together to form a ring.

10. The catalyst component according to claim 9, wherein in Formula II, $R^I$ is selected from the group consisting of methyl, ethyl, n-propyl, isopropyl, n-butyl, isobutyl, sec-butyl, tert-butyl, pentyl, isopentyl, neopentyl, hexyl, ethenyl, allyl, ethynyl, phenyl, halogenated phenyl, alkyl-substituted phenyl, naphthyl, and biphenyl; and/or, $R^{II}$ is selected from the group consisting of methyl, ethyl, n-propyl, isopropyl, n-butyl, isobutyl, sec-butyl, tert-butyl, pentyl, isopentyl, neopentyl, hexyl, ethenyl, allyl, ethynyl, phenyl, halogenated phenyl, alkyl-substituted phenyl, naphthyl, biphenyl, ethoxycarbonyl, propoxycarbonyl, isopropoxycarbonyl, butoxycarbonyl, isobutoxycarbonyl, hexoxycarbonyl, isohexoxycarbonyl, neohexoxycarbonyl, heptyloxycarbonyl, isoheptyloxycarbonyl, neoheptyloxycarbonyl, octyloxycarbonyl, isooctyloxycarbonyl, and neooctyloxycarbonyl.

11. The catalyst component according to claim 9, wherein the diol ester compound is as shown Formula IIIa:

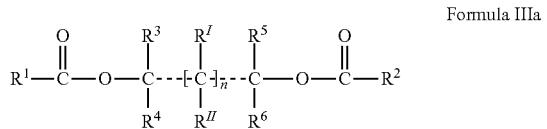

Formula IIIa wherein in Formula IIIa, $R^1$, $R^2$ and $R^3$-$R^6$ are identical to or different from each other, each independently selected from the group consisting of $C_1$-$C_{20}$ alkyl, $C_3$-$C_{20}$ cycloalkyl, $C_2$-$C_{20}$ alkenyl, $C_6$-$C_{30}$ arylalkyl, $C_6$-$C_{30}$ alkylaryl, and $C_9$-$C_{40}$ fused aryl and ester group; $R^I$ and $R^{II}$ are identical to or different from each other, each independently selected from the group consisting of hydrogen, $C_1$-$C_{20}$ alkyl, $C_3$-$C_{20}$ cycloalkyl, $C_2$-$C_{20}$ alkenyl, $C_6$-$C_{30}$ arylalkyl, $C_6$-$C_{30}$ alkylaryl, and $C_9$-$C_{40}$ fused aryl and ester group; $R^3$-$R^6$ and $R^I$-$R^{IV}$ each optionally contains one or more heteroatoms as a substitute of a carbon or hydrogen atom or both, the heteroatom being oxygen, sulfur, nitrogen, boron, silicon, phosphorus, or halogen atom; one or more of $R^3$-$R^6$, $R^I$, and $R^{II}$ are optionally bonded to form a ring; n is an integer ranging from 1 to 5.

12. The catalyst component according to claim 11, wherein the diol ester compound is as shown in Formula IIIb:

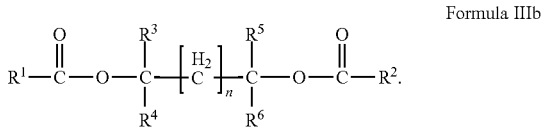

Formula IIIb

13. The catalyst component according to claim 9, wherein in Formula III, Formula IIIa and/or Formula IIIb, each of $R^1$ and $R^2$ is independently selected from the group consisting of methyl, ethyl, n-propyl, isopropyl, n-butyl, isobutyl, sec-butyl, tert-butyl, pentyl, hexyl, hydroxyalkyl, phenyl, halogenated phenyl, alkyl-substituted phenyl, naphthyl, biphenyl, and a heterocycle-containing group.

14. The catalyst component according to claim 9, wherein in Formula III, each of $R^I$ and $R^{II}$ is independently selected from the group consisting of methyl, ethyl, n-propyl, isopropyl, n-butyl, isobutyl, sec-butyl, tert-butyl, pentyl, hexyl, hydroxyalkyl, phenyl, halogenated phenyl, and alkyl-substituted phenyl.

15. The catalyst component according to claim 7, wherein the aromatic carboxylate ester compound is one or more selected from the group consisting of ethyl benzoate, propyl benzoate, butyl benzoate, pentyl benzoate, hexyl benzoate, heptyl benzoate, octyl benzoate, nonyl benzoate, decyl benzoate, isobutyl benzoate, isopentyl benzoate, isohexyl benzoate, isoheptyl enzoate, isooctyl benzoate, isononyl benzoate, isodecyl benzoate, neopentyl benzoate, neohexyl benzoate, neoheptyl benzoate, neooctyl benzoate, neononyl benzoate, neodecyl benzoate, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisohexyl phthalate, diisoheptyl phthalate, diisooctyl phthalate, diisononyl phthalate, diisobutyl 3-methylphthalate, di-n-butyl 3-methylphthalate, diisopentyl 3-methylphthalate, di-n-pentyl 3-methylphthalate, diisooctyl 3-methylphthalate, di-n-octyl 3-methylphthalate, diisobutyl 3-ethylphthalate, di-n-butyl 3-ethylphthalate, di-n-octyl 3-ethylphthalate, diisobutyl 3-ethylphthalate, di-n-pentyl 3-ethylphthalate, diisopentyl 3-ethylphthalate, diisobutyl 3-propylphthalate, di-n-butyl 3-propylphthalate, diisobutyl 3-chlorophthalate, diisobutyl 3-butylphthalate, di-n-butyl 3-butylphthalate, di-n-butyl 4-butylphthalate, diisobutyl 4-propylphthalate, diisopentyl 4-butylphthalate, di-n-butyl 4-chlorophthalate, diisobutyl 4-chlorophthalate, di-n-octyl 4-chlorophthalate, di-n-butyl 4-methoxyphthalate, and diisobutyl 4-methoxyphthalate; and/or the diether compound is one or more selected from Gall the group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-norbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

16. A catalyst for olefin polymerization, comprising:
A) the catalyst component according to claim 1;
B) an organoaluminium compound; and optionally,
C) an organosilicon compound.

17. The catalyst according to claim 16, wherein the olefin is propene.

18. A method for making a polymer, comprising polymerizing olefins in the presence of the catalyst component according to claim 1.

19. A method for making a polymer, comprising polymerizing olefins in the presence of the catalyst according to claim 16.

20. The catalyst component according to claim 3, wherein the heterocycle-containing group is a pyrrole-containing group, a pyridine-containing group, a pyrimidine-containing group, or a quinolone-containing group.

21. The catalyst component according to claim 13, wherein the heterocycle-containing group is a pyrrole-containing group, a pyridine-containing group, pyrimidine-containing group, or a quinoline-containing group.

22. The catalyst component according to claim 7, wherein a molar ratio of the imine compound with a ketone group as shown in Formula I to the additional electron donor compound is in a range of 1:(0.1-10).

23. The process according to claim 18, wherein the olefin is propene.

24. The process according to claim 19, wherein the olefin is propene.

* * * * *